(12) United States Patent
Bose et al.

(10) Patent No.: US 8,332,864 B2
(45) Date of Patent: Dec. 11, 2012

(54) BUSINESS PROCESS AUTOMATION

(75) Inventors: Subhra Bose, Hauppauge, NY (US);
Steve Scimone, Massapequa, NY (US);
Nallan Sriraman, East Meadow, NY (US); Ziyang Duan, Hicksville, NY (US); Arthur Bernstein, East Setauket, NY (US); Philip Lewis, Stony Brook, NY (US); Radu Grosu, Rocky Point, NY (US)

(73) Assignee: Reuters America Inc., New York, NY (US)

( * ) Notice: Subject to any disclaimer, the term of this patent is extended or adjusted under 35 U.S.C. 154(b) by 1208 days.

(21) Appl. No.: 10/560,285

(22) PCT Filed: Jun. 10, 2004
(Under 37 CFR 1.47)

(86) PCT No.: PCT/US2004/018435
§ 371 (c)(1),
(2), (4) Date: Jun. 30, 2008

(87) PCT Pub. No.: WO2004/114061
PCT Pub. Date: Dec. 29, 2004

(65) Prior Publication Data
US 2008/0320486 A1 Dec. 25, 2008

Related U.S. Application Data

(60) Provisional application No. 60/477,757, filed on Jun. 12, 2003.

(51) Int. Cl.
*G06F 9/46* (2006.01)
(52) U.S. Cl. ......... 718/106; 718/100; 718/101; 718/102
(58) Field of Classification Search .................. 718/100, 718/101, 102, 106
See application file for complete search history.

(56) References Cited

U.S. PATENT DOCUMENTS

| 5,339,421 A | 8/1994 | Housel, III |
| 7,366,751 B2 * | 4/2008 | Ishibashi et al. ............... 709/201 |
| 2002/0052769 A1 * | 5/2002 | Navani et al. ..................... 705/7 |

(Continued)

FOREIGN PATENT DOCUMENTS

JP 2001-184200 A 7/2001

(Continued)

OTHER PUBLICATIONS

Thorpe "Business Rule Exchange—the Next XML Wave", Proceedings of XML Europe, 2001 pp. 1-29 http://www.gca.org/papers/xmleurope2001/papers/pdf/s15-2.pdf.*

(Continued)

*Primary Examiner* — Emerson Puente
*Assistant Examiner* — Willy W Huaracha
(74) *Attorney, Agent, or Firm* — Banner & Witcoff, Ltd.

(57) ABSTRACT

A system for business processes within and between organizations and/or individuals may be automated using standards-based, service-oriented business process automation architectures based on XML and Web Services Standards is described. An execution framework for the business processes is also described. Further aspects include a decomposition methodology for deconstructing business process specifications into business flows, business rules and business states. The business flows (FIG. 9, #214), rules (FIG. 9, #214) and states (FIG. 9, #214) may be defined in declarative languages and include the interaction, cooperation and coordination between the flow, rules and state engines, and the execution model for business processes within the framework.

29 Claims, 8 Drawing Sheets

U.S. PATENT DOCUMENTS

Figure 1:
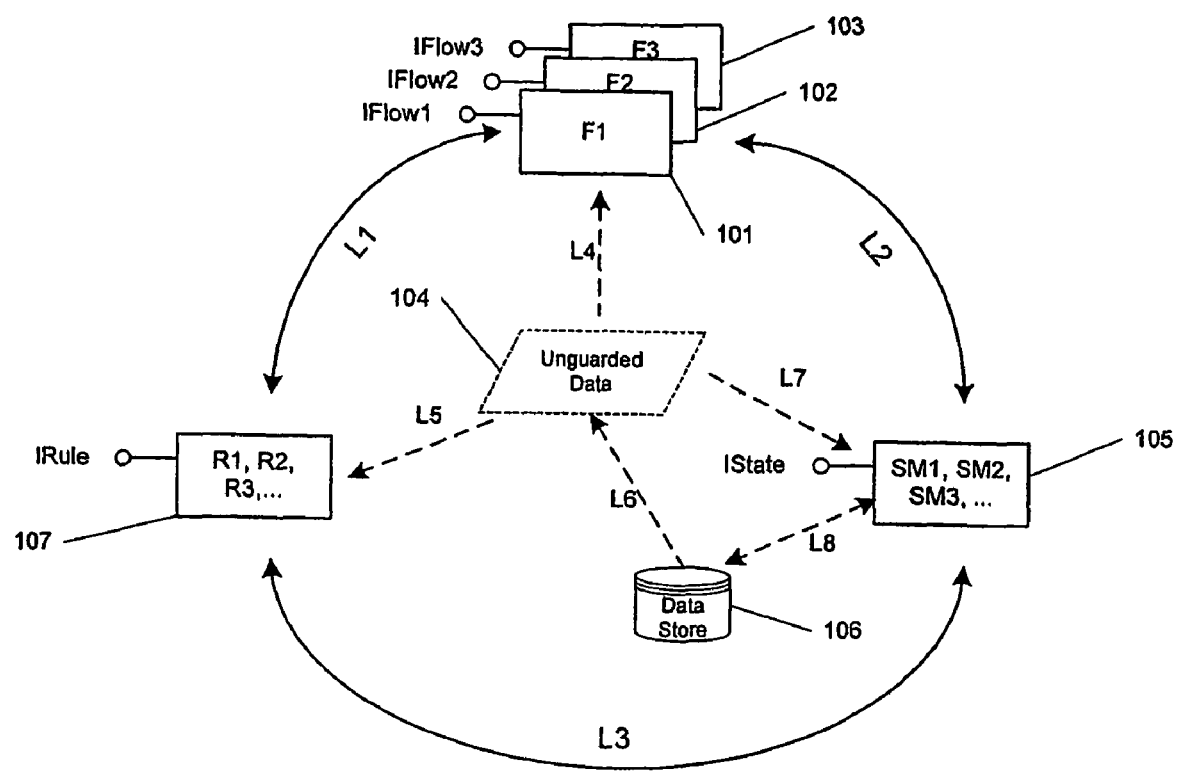

| | | | |
|---|---|---|---|
| 2003/0055672 A1 | 3/2003 | Inoki et al. | |
| 2003/0090514 A1* | 5/2003 | Cole et al. | 345/744 |
| 2003/0187743 A1* | 10/2003 | Kumaran et al. | 705/26 |
| 2004/0216039 A1* | 10/2004 | Lane et al. | 715/511 |
| 2005/0027585 A1* | 2/2005 | Wodtke et al. | 705/9 |
| 2005/0096959 A1* | 5/2005 | Kumar et al. | 705/8 |
| 2005/0138132 A1* | 6/2005 | Zhou et al. | 709/207 |

FOREIGN PATENT DOCUMENTS

| | | |
|---|---|---|
| JP | 2002366352 A | 12/2002 |
| JP | 2003-50904 A | 2/2003 |
| WO | 02054263 | 7/2002 |
| WO | 03005167 | 1/2003 |
| WO | 03036547 | 5/2003 |

OTHER PUBLICATIONS

Notice of Reasons for Rejection for Japanese Patent Application No. 2006-533674, mailed Dec. 7, 2009, 7 pages.

European Search Report for European Application No. 04776423.8, mailed Jun. 23, 2010.

Supplementary European Search Report, mailed Apr. 8, 2010, 3 pages.

Heather Kreger, "Web Services Conceptual Architecture (WSCA 1.0)", May 2001, XP002203346, retrieved from the Internet <http://www-3.ibm.com/software/solutions/webservices/pdf/WSCA.pdf>, 42 pages.

Gottschalk, K et al, "Introduction to Web services architecture", IBM Systems Journal, IBM Corp. Armonk, New York, vol. 41, No. 2, Jan. 1, 2002, pp. 170-177, XP002482855, ISSN: 0018-8670, 8 pages.

Martin: "Principles of Object-Oriented Anayksis and Design", Oct. 29, 1992, pp. 103-153 and 321-245.

Blake: "Toward the Use of Agent Technology of B2B Electronic Commerce", Jun. 28, 2002, 16 pages total—pp. 1,10 and 11.

Decision of Rejection for Japanese Patent Application No. 2006-533674 mailed Oct. 14, 2010, 11 pages.

Notice of Reasons for Rejection for Japanese Application No. 2011-028234 mailed Jul. 5, 2012.

* cited by examiner

BUSINESS PROCESS AUTOMATION

This application is a national stage application of co-pending PCT application PCT/US2004/018435 filed Jun. 10, 2004, which was published in the U.S. under PCT Article 21(2) on Dec. 29, 2004, which claims priority to U.S. Provisional Application No. 60/477,757, filed Jun. 12, 2003, entitled "Business Process Automation", to Subhra Bose, Steve Scimone, Nallan Sriraman, Arthur Bernstein, Philip C. Lewis, Radu Grosu, Ziyang Duan, the contents of which are hereby incorporated herein by reference in its entirety

1 RELATED APPLICATION INFORMATION

This application claims priority to U.S. Provisional Application No. 60/477,757, filed Jun. 12, 2003, entitled "Business Process Automation", to Subhra Bose, Steve Scimone, Nallan Sriraman, Arthur Bernstein, Philip C. Lewis, Radu Grosu, Ziyang Duan, the contents of which are hereby incorporated herein by reference in its entirety.

2 FIELD OF THE INVENTION

Aspects of the present invention relate to software and business applications. More particularly, aspects of the present invention relate to automating business applications.

3 BACKGROUND OF THE INVENTION

A business process is a collaborative execution of business activities according to the specific business rules in order to achieve some business goals. Financial Services and other Businesses have put in a lot of effort into reengineering their business processes to lower cost and improve efficiency. Recently, with the help of the rapid advancement of computer and information technology, complex business processes in financial services and other industries can now be automated, tasks which were traditionally performed manually. This brings up many new challenges: 1) Business processes need to be easily created, deployed and updated. 2) Business processes needs to be constructed in an interoperable way, so that different organizations and departments can integrate their business processes together. 3) Correctness and security of a business process needs to be guaranteed. 4) Tools are needed to facilitate business process management and reusability.

XML has appeared as the new standard for data representation and exchange of the World Wide Web. More and more applications have been built based on XML to facilitate interoperability between different heterogeneous systems. XML-Schema has become a standard to specify semi-structured data-types in XML. Much work has been done on understanding semi-structured data types and their relationship with relational data. Web service protocols, such as SOAP, WSDL, and UDDI provides ubiquitous interoperability of services, and allow coordination of highly distributed services in a business process. Native XML databases are emerging on the market to provide XML data stores with query and update capabilities.

Workflow is known in the art and provides a way to separate the control logic from the system components, and specify the control logic at a high level. According to Workflow Management Coalition, workflows are computational models of business processes. Workflow systems are originally developed for office automation. Those systems are targeted for simple tasks such as document processing and file sharing. Then people have been considering more complex transactional workflows to model business process. Various extended transaction models, which are based on transaction models with relaxed atomicity and isolation, have a nice theoretical framework inherited from database transactions. However, few of them are implemented in commercial systems. The workflow model generalizes them, provides much broader functionality and is a more appropriate framework to address complex business processes. During the past few years, many commercial systems have been developed, such as Tibco's BPM, Microsoft's BizTalk, IBM's Exotica/FlowMark, etc. Many research prototypes have been created, such as ConTract and Mentor etc. Many formal methods have been proposed for workflow modeling and execution: event algebra, state chart, petri net, temporal logic, transaction logic and etc. XML based standards have been proposed to define and model workflows as interactions of web services, such as BPML, WSCL, WSCI, BPEL4WS, etc.

Rules engines have also been under development for years. Currently there are several standards and commercial systems that are provided by IBM, Microsoft, iLog, Blazesoft and others. The rule engines can consume rule definitions and execute different types of rules, such as validation rules, business policy rules and business decisions. There are different types of rule engines as well e.g. inference engines and decision tree engines. Business processes often contain multiple business rules. Because most programming environments are designed for either data or procedures, when confronted with a business specification written as a collection of rules, the developer is faced with a tricky problem. The rules cannot be expressed in data, and coding them procedurally leads to "spaghetti code." Further, the original logical structure of the rules, which take a declarative form and are easy to understand, get lost in the code, become difficult to debug, and almost impossible to update if necessary. There exist several emerging standards for rule description. One such standard, namely RuleML is the canonical Web language for rules using XML markup, formal semantics, and efficient implementations. RuleML covers the entire rule spectrum, from derivation rules to transformation rules to reaction rules. RuleML can thus specify queries and inferences in Web ontologies, mappings between Web ontologies, and dynamic Web behaviors of workflows, services, and agents.

State machines have been widely used for modeling reactive systems. The original finite-state machines have been extended to express hierarchy and concurrency, such as in Statechart. Many works have been done to define semantics and build modeling tools based on state machines. Software design languages and tools, such as UML, ROOM, and STATE-MATE, have employed variations of state machines. Despite the existence of these technologies, problems still remain in business process automation and management.

4 SUMMARY

Aspects of the present invention provide a framework and methods that solve at least one of the above problems in business process automation and management. In this framework, business processes may be modeled as integration of flows, rules and state machines. XML and web service standards may be used as the basis to provide interoperability. Standard based declarative languages may be used for high level specification of a business process and its components; Specifications may be based on formal logical models so that automatic verification and model checking methods can be developed to guarantee correctness. Semantics may be formally defined and methods of semantic based verification and workflow synthesis are provided.

Aspects of the present invention propose an enhanced use of the flow, rule and state engines. A business process is specified in a declarative language such as XML which represents the control within the business process, the externalized business rules and the states of the business entities. The relevant portions of the specification are executed in the flow, rules and state engines. Each of these engines provides specific computational aspects to the execution environment described in at least one aspect of the invention.

The ability to describe the key constituents of a business process in a declarative syntax reduces the impedance mismatch between the business requirements and technology implementation. The methodology described herein brings a uniform structure to the thought process of business and technology people, from requirements analysis to design to implementation. The creation of business process applications as per this methodology forces the developer to focus on the business application logic rather than infrastructure code. The framework provides the reliability during business process execution by adhering to a set of design patterns and exception handling. The framework also provides the ability to create an inventory of reusable business activities which, as it evolves, significantly reduces the application development time.

In view of the above described problems associated with the automation of business processes, at least one aspect of the present invention provides a system and method by which business process within and between organizations and/or individuals can be automated using standards based, service oriented business process automation architecture based on XML and Web Services Standards including but not limited to SOAP, WSDL, WSIL, UDDI and BPEL4WS. At least one aspect of the invention furthermore includes an execution framework for the business processes including but not limited to financial business processes applications involving simple and complex machine and human workflows, business rules evaluation, lifecycle management of business entities and integration with existing applications.

Further, at least one aspect of the present invention provides a decomposition methodology for business process specifications into business flows, business rules and business states. The business flows, rules and states are defined in declarative languages including but not limited to standard or custom XML based languages. At least one aspect of the invention includes system and method for runtime execution of the business flows, rules and states described in declarative syntax on commercial and/or custom built flow, rules and state engines. At least one aspect of the invention includes the interaction, cooperation and coordination between the flow, rules and state engines; and the execution model for business processes within the framework.

In yet another aspect of the invention, business process descriptions are classified according to a set of predefined taxonomy. This includes the mechanism to search business process definitions for a given name in a taxonomy category; and also given a business process the categories and names it points to. At least one aspect of the invention furthermore includes the management of the business processes executing in the framework comprising of registry, discovery, monitor, Service Level Agreement (SLA) managements and autonomic fulfillment of SLAs.

In another aspect, the present invention may provide a formal mechanism to define the semantics of business processes and their components. This may be done by annotating the business process specification with syntax for assertions including but not limited to pre-conditions and post-conditions, supported by rigid mathematical model, so that semantic correctness can be automatically verified at design time and run time. At least one aspect of the invention includes mechanism for automatic verification and guarantee of the semantic correctness of business process at design time and runtime. The system achieves correctness by semantic check and model checking of the declarative specification of the business processes.

Further, at least one aspect of the present invention is to provide a method for the construction of a library of a semantically well-defined business activities or tasks. This makes it possible to automatic construct new workflows including but not limited to exception flows within and across business processes based on a library of semantically well-defined components and business goals of the new workflows. At least one aspect of the present invention includes the algorithm for generation of such automatic workflows.

A yet further aspect of the invention is to provide a method for the loose coupling between business logic and presentation logic for business process applications.

5 BRIEF DESCRIPTION OF THE FIGURES

FIG. 1 provides a logical representation of flows, rules and states and interactions between them in accordance with aspects of the present invention.

Figure 2:
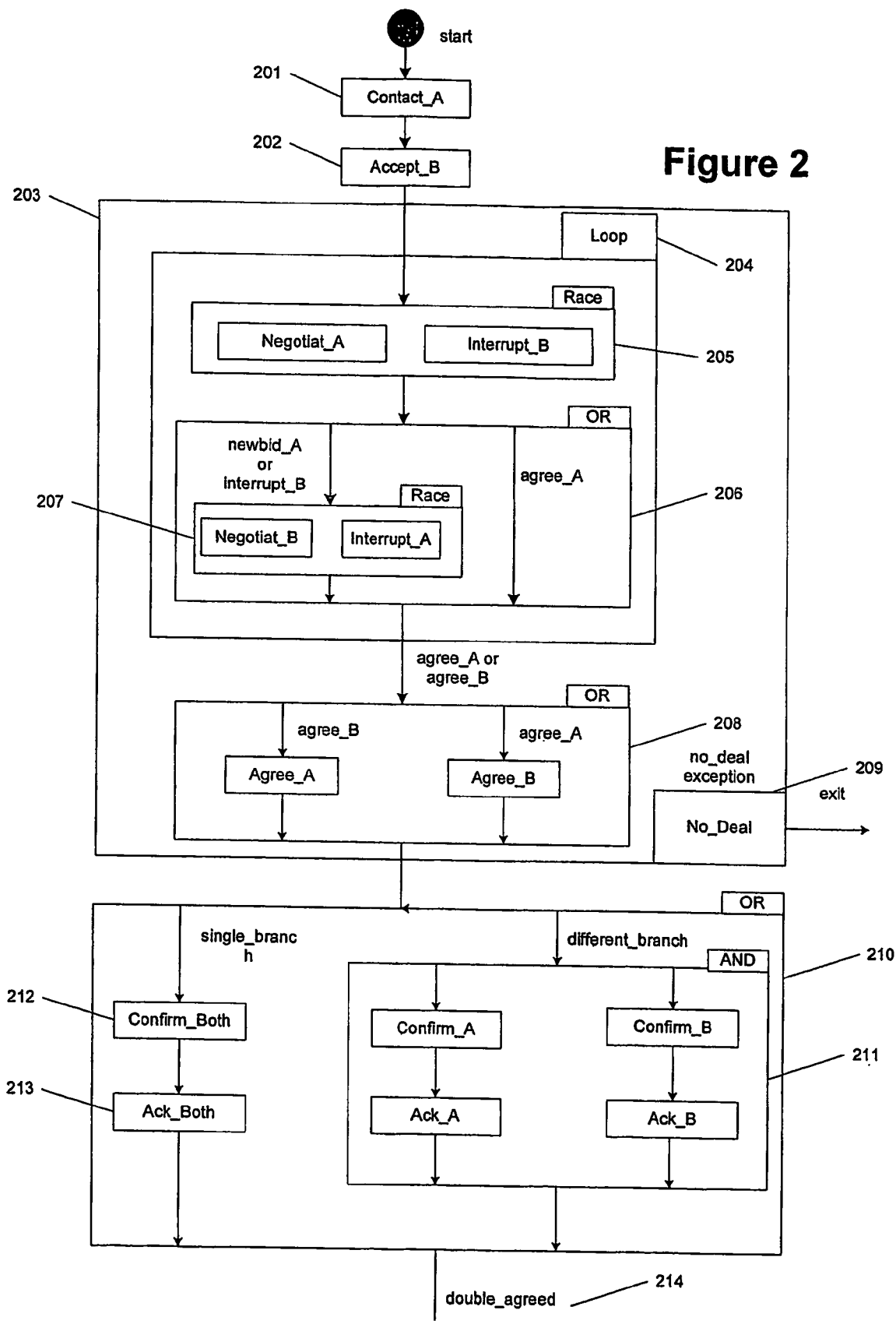

FIG. 2 provides an example of a trading workflow in accordance with aspects of the present invention.

Figure 3:
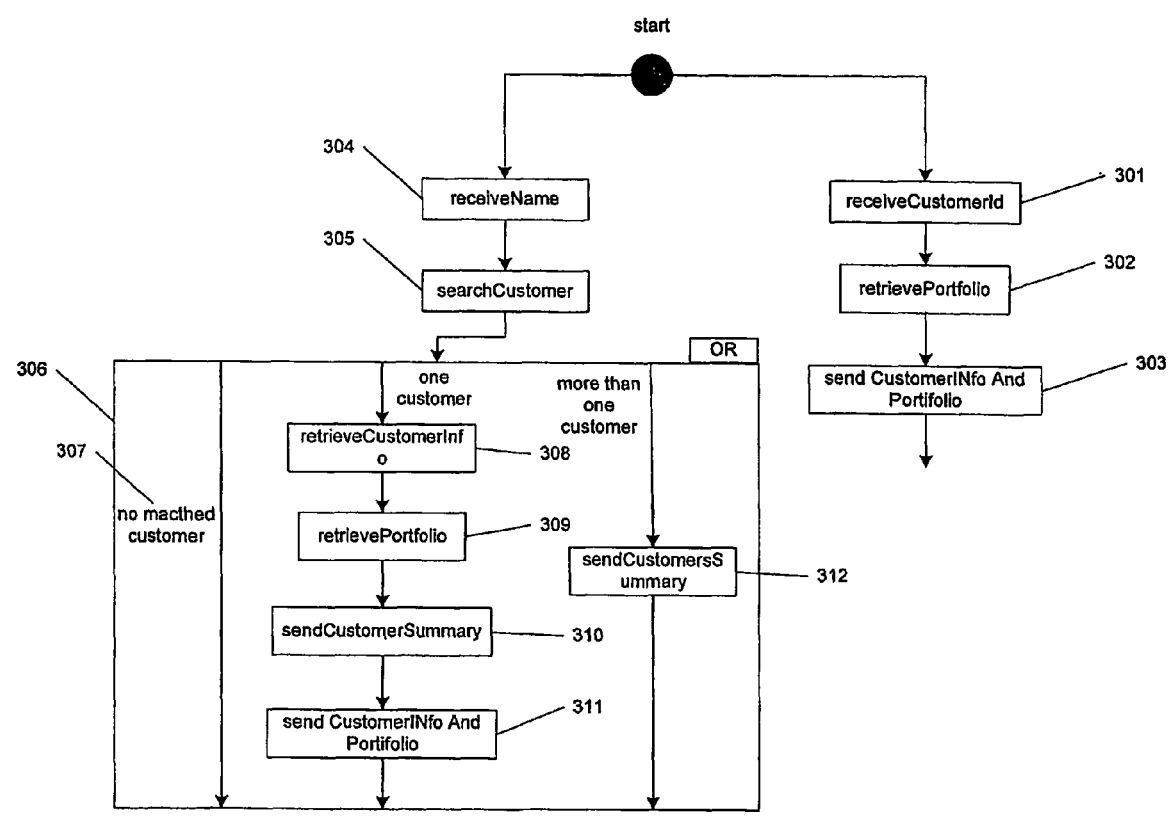

FIG. 3 provides an example of portfolio retrieval in accordance with aspects of the present invention.

Figure 4:
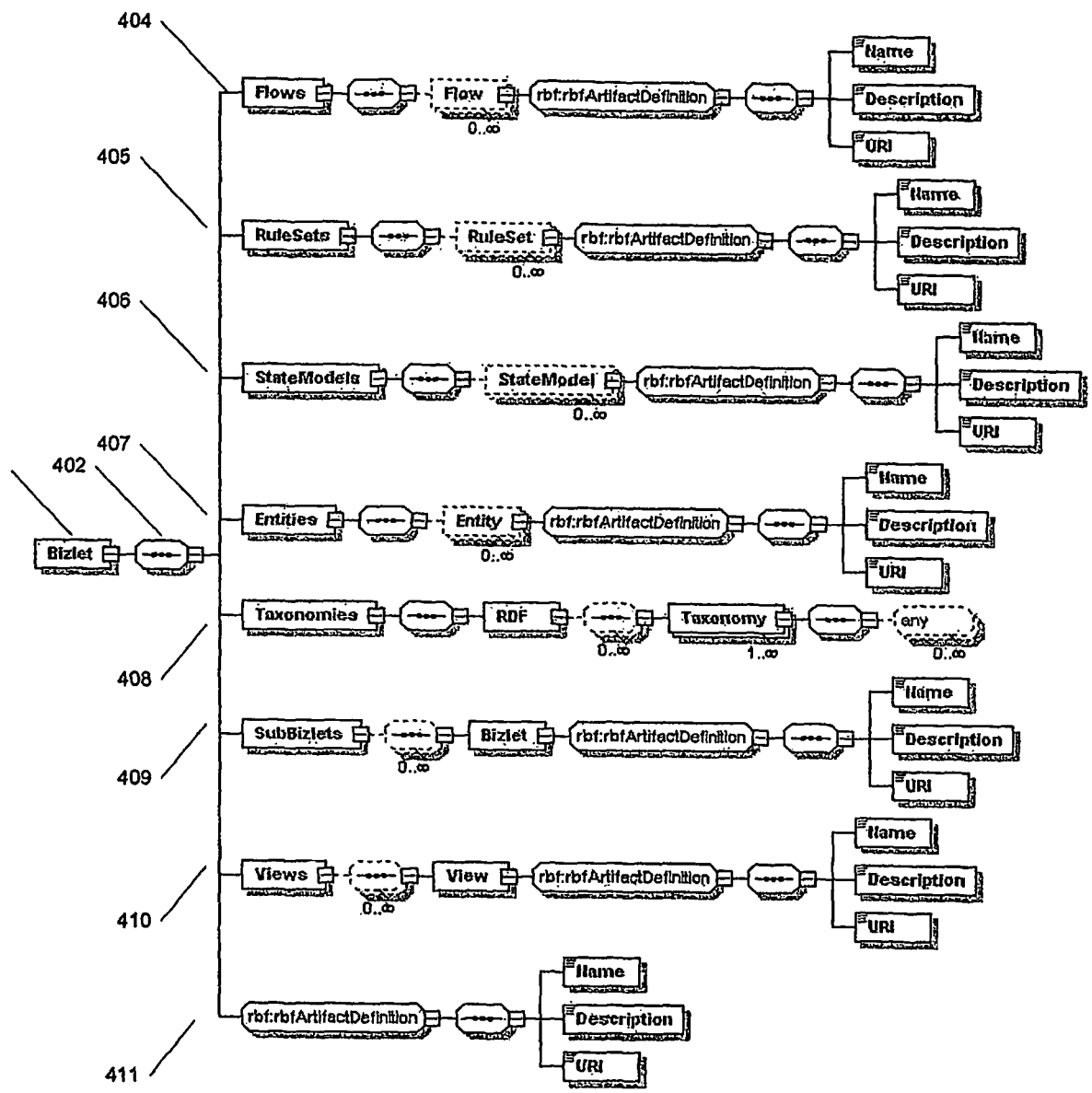

FIG. 4 provides a graphical representation of business process definition language in accordance with aspects of the present invention.

Figure 5:
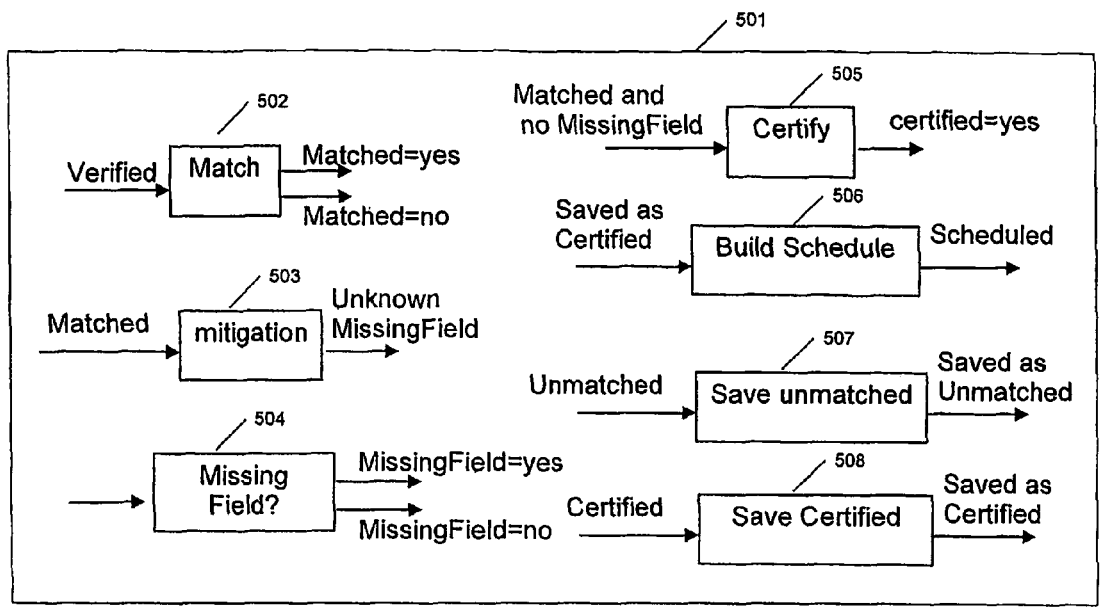

FIG. 5 provides an example of a task library forming part of the corporate action workflow in accordance with aspects of the present invention.

Figure 6:
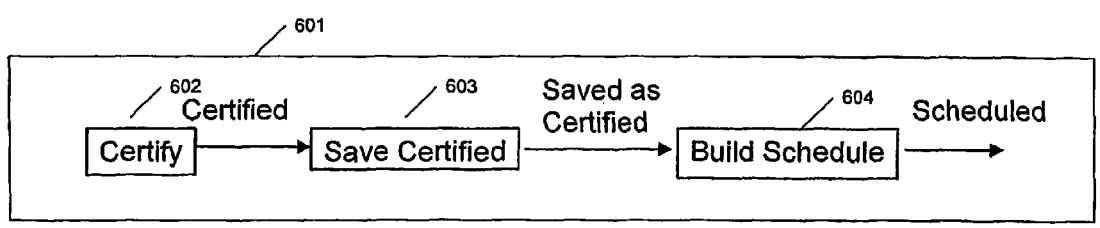

FIG. 6 provides a graphical representation of a construct for a sequence in accordance with aspects of the present invention.

Figure 7:
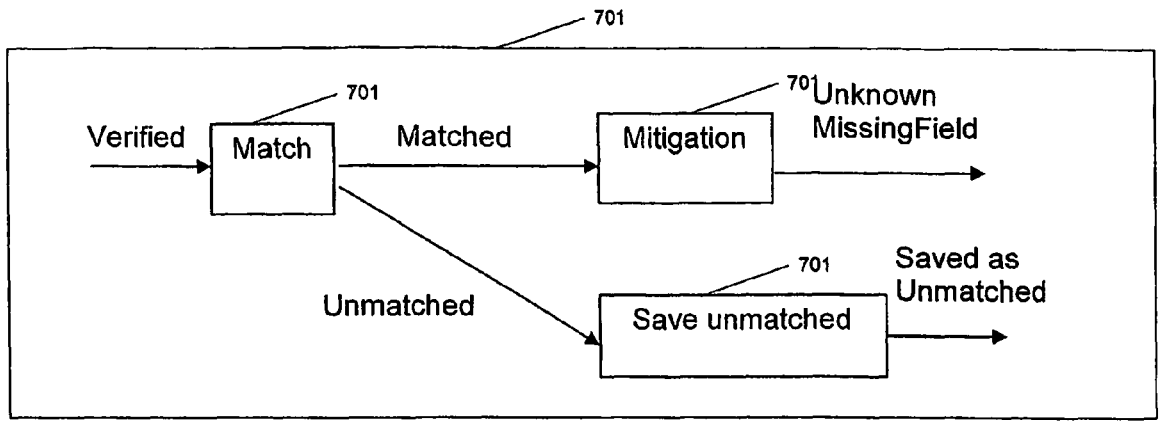

FIG. 7 provides a graphical representation of a construct for a switch in accordance with aspects of the present invention.

Figure 8:
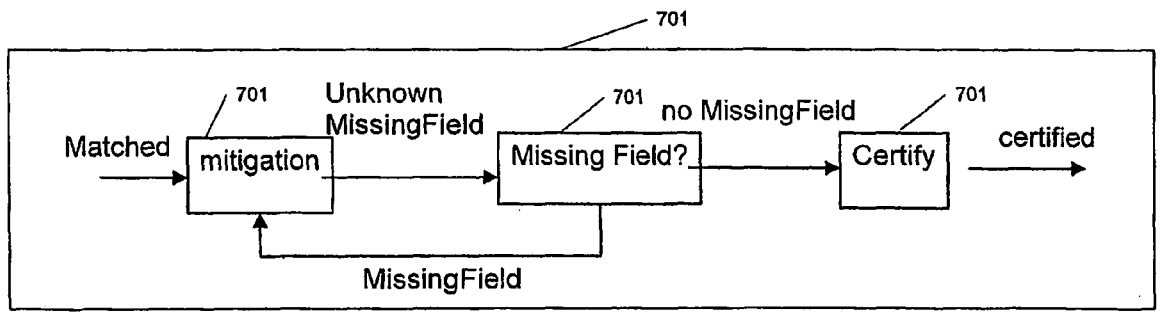

FIG. 8 provides a graphical representation of a construct for a loop in accordance with aspects of the present invention.

Figure 9:
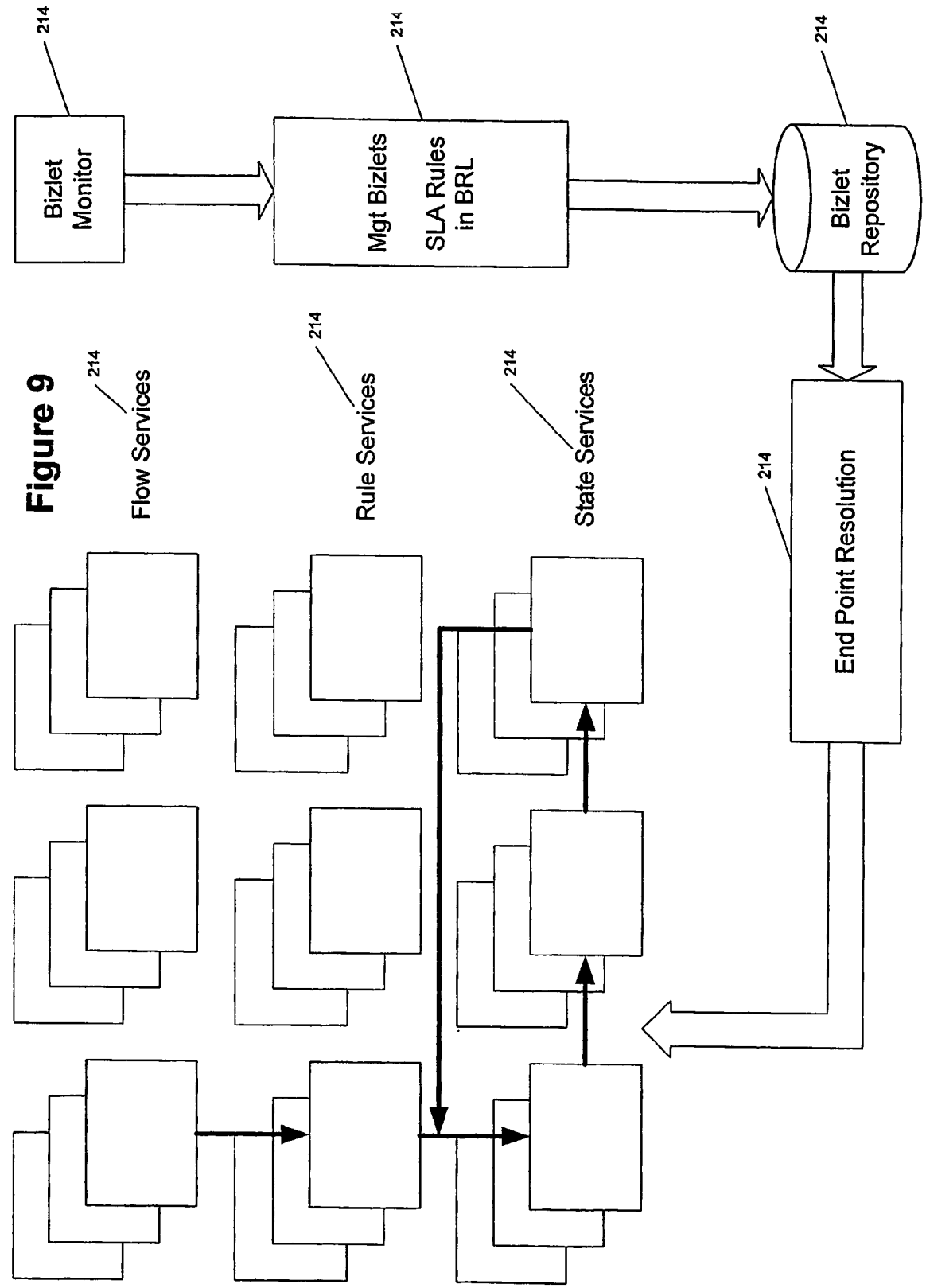

FIG. 9 provides a graphical representation of a business process management in a ubiquitous compute environment in accordance with aspects of the present invention.

Figure 10:
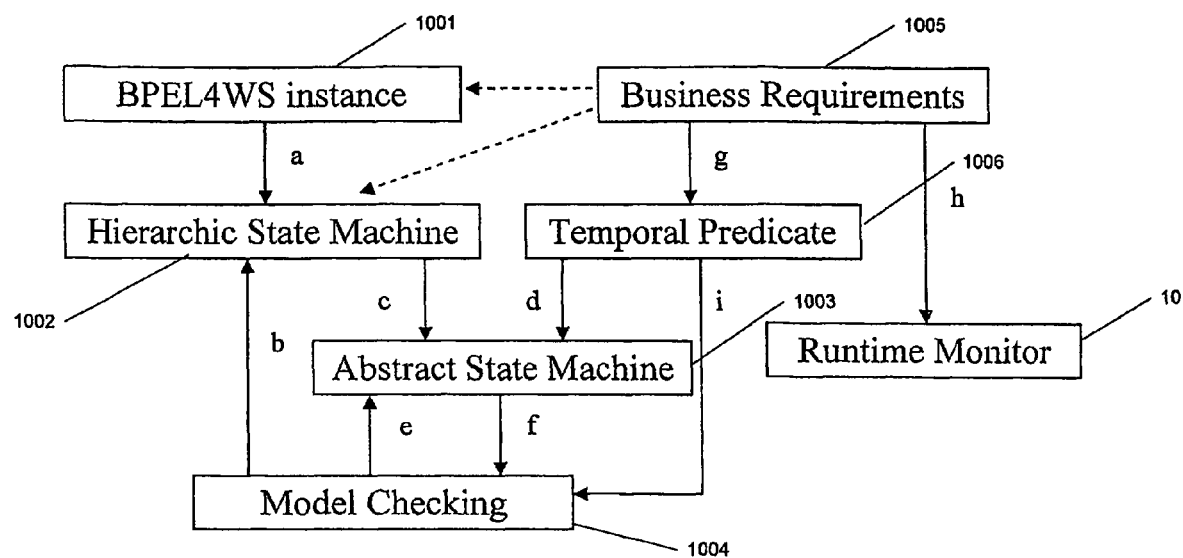

FIG. 10 provides an illustration of model checking in the business process execution framework in accordance with aspects of the present invention.

6 DETAILED DESCRIPTION

Aspects of the present invention relate to a system and method by which business process within and between organizations and/or individuals can be automated using standards-based, service-oriented business process automation architecture based on XML and Web Services Standards including, but not limited to, SOAP, WSDL, WSIL, UDDI and BPEL4WS. At least one aspect of the invention furthermore includes an execution framework for the business processes including but not limited to financial business processes applications involving simple and complex machine and human workflows, business rules evaluation, lifecycle management of business entities and integration with existing applications. Aspects of the present invention further relate to a decomposition methodology for deconstructing business process specifications into business flows, business rules and business states. The business flows, rules and states are defined in declarative languages and include the interaction, cooperation and coordination between the flow, rules and state engines, and the execution model for business processes within the framework.

The various business flows, rules and states described herein may be resident on computer readable media including but not limited to removable media, fixed media, optical and magnetic storage, and the like. For instance, aspects of the invention may be resident in a host computer or computing network or on a client-side computer.

The following description is separated as follows to assist the reader:

6.1 Decomposition of a Business Process into Flows, Rules and States (FRS)
    6.2 Taxonomy of BPD and constituent Flows, Rules and States
    6.3 Declarative Specification of BPIs
    6.3.1 Flow Specifications
    6.3.2 Semantics of Actions
    6.3.3 Assertions at different points in the workflow
    6.4 BPI Execution Framework
    6.4.1 Flow, Rule and State Engines
    6.4.2 Coordination between BPI Flows, Rules and States
    6.4.3 Management of BPIs
    6.5 Correctness of business process workflow
    6.5.1 Automatically annotate a workflow
    6.5.2 Automatically verify the correctness of a workflow
    6.6 Model Checking of Business Processes
    6.6.1 Model Checking Approach
    6.6.2 Design Time Model Checking
    6.6.3 Runtime Monitoring
    6.7 Automatic synthesis of Business workflows
    6.8 BPI Framework based Applications (possible examples but not limited to)
    6.8.1 Corporate Actions Management
    6.8.2 Order Management Systems Integration with Market Data, Portfolio and Compliance Applications
    6.8.3 Data Management System The following sections relate to illustrative schemas and example instances that may be used in accordance with aspects of the present invention.

7 SCHEMAS AND EXAMPLE INSTANCES 7.1 Schema1: BPDL Schema
    7.2 XML-Schema specification of the concrete data model of the negotiation process
    7.3 An instance of the Negotiation Data Model
    7.4 Example of high-level data model 6.1 Decomposition of a Business Process into Flows, Rules and States (FRS)

Business Process Management (BPM) is becoming more and more important in the business world. Companies are trying to automate their business processes so that they can lower cost and improve efficiency. In addition, they need the ability to quickly integrate new processes and adapt existing processes in order to face the challenge of the fast-changing market.

A business process, in simple, is a collaborative execution of activities according to the specific business rules in order to achieve some business goals. An activity is a unit of work that is either automatically performed by a computer system, or manually by human beings. Activities, which are performed by computers or computer-human interactions, are considered here. The following two examples show some typical business processes.

EXAMPLE 1

(FIG. 2): This example shows the negotiation process between two traders, A and B. The business goal of this process is trying to reach agreement on a deal and then settle the deal through the confirmation process. The process starts when trader A contacts B and makes an offer (i.e., sell 1000 share of stock A at a certain price). If B accepts the offer and makes a counter offer, A and B will start to negotiate until either one party quits with no deal or a mutual agreement is made. If agreement is reached, the deal will be confirmed and settled. If the two traders belong to the same financial branch, the settlement can be done at once. Otherwise, each party has to settle the deal separately.

EXAMPLE 2

(FIG. 3): In this example, the financial advisor wants to retrieve the portfolio information of a customer by his name. He first types in the name to search in the customer database. The summary information of each customer whose name matches the search criteria will be listed in a grid view. If there is only one customer listed, his portfolio information will be retrieved and presented automatically. Otherwise, the advisor can choose one customer from the list and request his portfolio information being presented.

A Business Process Management System provides capabilities to design, deploy, and manage automated business processes. It provides tools for designing a business process using given activities as building blocks and following the given business rules; It provides facilities to deploy and manage business processes in an organization; Furthermore, it provides a framework to control the execution of business processes and to coordinate the activities during an execution.

Business processes are becoming increasingly complex and there is a growing need for automated and streamlined business processes in a more distributed and heterogeneous environment. The activities involved in a business process are generally involving activities from different groups in an organization, or across different organizations. They are probably implemented with different computer languages, running on different platforms and using different protocols to interact with each other. The coordination among these activities and tracking them in a business process is a challenging problem.

Recently, the widespread adoption of web services has begun to fulfill the promise of a universally interoperable component model. Specifically, it makes reusability and language/platform independence possible in business process management. Components that are implemented in different languages and for different platforms can be packaged as web services to achieve interoperability. The XML-based web services languages (e.g., SOAP, WSDL, UDDI) decouple implementation from interface; as a result, an organization can, in theory, create entire solutions using best-of-breed web services as building blocks. Web services standards have matured to a "production-ready" degree and continue to evolve as acceptance increases. More and more, one finds web services employed in the enterprise to achieve enterprise application integration (EAI) as well as business-to-business and business-to-consumer interactions (B2B/B2C).

Yet in contrast to the technological maturity of web services, the tools available for Business Process Management by web services orchestration remain relatively primitive. How does one express real world business processes as an aggregate of web services and message flows? In most cases, skilled integrators create a "master application" which calls the component web services in proper order, tracks key values used by them, aggregates the results, etc. This "code the business logic" approach can work, in the sense that it can successfully fulfill the business requirements of the moment, but it fails to leverage the benefits of the component model: When such a "point solution" is created rather than a "productized solution", recuring patterns in business semantics cannot be easily reused the way recurring functionality can; they often need to be coded anew for the next solution to come along. Even worse, in an effort to gain reusability, business semantic considerations can tend to get pushed into the web services themselves, corrupting the component model and reducing the web services' reuse potential. Without an adequate means of modeling higher level business abstractions, the IPR associated with the business process flows, data, and rules is lost.

At least one aspect of the invention is a framework for business process management based on existing web services standards. The term Business Process Instance (BPI) is defined as an automated business process with arbitrary level of granularity, which comprises of business flows, rules and states. Multiple BPIs can be organized in a hierarchy to represent the automation of a larger business process. A definition of a business process instance is called a BPD. At least one aspect of the invention includes the methodology for creating Business Process Definitions (BPD) in a non-traditional manner and includes a framework to execution Business Process Instances (BPI). At least one aspect of the invention includes an XML-based language, Business Process Definition Language (BPDL), to specify business processes declaratively. A BPI specification not only defines how the business process should be executed, but also the exact "meaning" of executing the process, that is, what the process is supposed to do. In another word, the semantics of a business process is formally defined in addition to its runtime behavior. The business process management framework, referred to as BPI framework, provides tools, components and environment for business process definition, deployment, management and execution.

A BPI uses activities and data entities as its building blocks. It assumes that all the activities expose web service interfaces in WSDL, and therefore can be treated as web services. The data entities can be accessed as XML documents that are modeled by XML Schemas. BPDL describes a business process by decomposing it into three components: flows, rules and states. Flows define the control logic and data flow among the activities; rules define decision making policies and states define the legitimate behavior of business data entities in terms of state-transition models.

When creating a BPI, the plain English description of a business process is decomposed into its constituent business flows, rules and states. The first level break-down is a combination of structured English and diagrams in Unified Modeling Language (UML) or similar notations. The UML sequence diagrams and activity diagrams capture the execution order and logical dependency information among activities in a business process, and therefore form the basis of the BPD Flow specification. The UML state diagrams capture the state transition of business entities, and form the basis of BPD State Model. The rules are generally associated with decision points in a flow or state transitions in a state diagram. The rules are separated from the flow or state because, first, the rules might change but the general structure of the flow or state model keep the same. Second, the same rule might be used in different occasions. Third, it makes possible to externalize the business rules and empower the business user to change it. The flows, rules and states are then specified separately in a declarative form in BPDL.

BPD Flow specification language is based on BPEL4WS. BPEL4WS is an XML-based standard to define web service orchestration protocols, or workflows. WSDL and the BPEL4WS language is extended so that formal semantics can be annotated on web service operations and BPEL4WS workflows.

An XML based Business Rules Language (BRL) is used as the language-neutral description of varied types of business rules.

An XML based State Machine Language, StateML, is used to specify the state transition models of different business entities.

A BPD specification does not contain the specification of flows, rules and states directly. Instead, it refers to those definitions by adding a level of indirection. The following is a simplified example of a BPD specification on the trade negotiation process.

```
<?xml version="1.0" encoding="utf-16"?>
    <BPD>
        <Name>NegotiationBPI</Name>
        <Description>Trade Negotiation Process</Description>
        <URI>http://fauxuri.reuters.com/NegotiationBPI </URI>
        <Flows>
            <Flow>
                <Name>Negotiation</Name>
                <Description>    negotiation    process
flow</Description>
        <URI>http://fauxuri.reuters.com/NegotiateBPI/flow</URI>
            </Flow>
        </Flows>
        <RuleSets>
            <RuleSet MajorRevision="1" MinorRevision="0">
                <Name>Branch</Name>
                <Description>Decide if the two traders are from the
same branch</Description>
        <URI>http://fauxuri.reuters.com/negotiationBPI/rs/branch</URI>
            </RuleSet>
            <RuleSet MajorRevision="1" MinorRevision="0">
                <Name>match</Name>
                <Description>Decide if one trader's request matches
the interest of another </Description>
        <URI>http://fauxuri.reuters.com/NegotiationBPI/rs/match</URI>
            </RuleSet>
        </RuleSets>
        <StateModels>
            <StateModel>
                <Name>NegotiationASM</Name>
                <Description>state machine for trader negotiation
data</Description>
        <URI>http://fauxuri.reuters.com/NegotiationBPI/negotiation/sm
        </URI>
            </StateModel>
        </StateModel>
    ...
    </BPD>
```

6.2 Taxonomy of BPD and Constituent Flows, Rules and States

The BPIs are analogous to components in a component oriented software development. One of the drawbacks in the component oriented software development is that the enormous numbers of components overlap with each other and there is no central repository of components or information about components to avoid the same. In the Web Services paradigm this problem is solved by the notion of UDDI, which can be used as a repository for the meta-information pertaining to the web services. Since BPIs are exposed as Web Services the same technique is valid in case of BPIs. BPI definition by BPDL contains the classification information for the BPI and its constituent flows, rules and states. The taxonomy of BPI is captured as a node in the BPDL document, as shown in FIG. 4.

6.3 Declarative Specification of BPIs

With the business requirements properly decomposed into our three major component categories, the requirements can be expressed as a synthesized set in a BPD document through BPDL, the XML-based business process definition language. The W3C-style schema for BPDL is showed in schema 1, and is graphically represented in FIG. 4.

BPDL contains primary elements under the root element <BPD>: <Flows>, <RuleSets>, <StateModels>, <Entities>, <SubBPDs>, and <Views>. We have already discussed the place of flows, rules, and state models within a BPD. Views provide reusable GUI capabilities in the same fashion that the other elements provide reusable back-end capabilities. Entities point to named business entities based on XML schemas related to the business process. And Sub-BPIs allow for existing BPIs to be reused as it is in much the same way that individual components are reused. Each of these primary elements contains one or more sub-elements designating a single instance of the parent collection through the use of a common set of sub-elements; this set, whose schema is captured in schema 1, provides the information necessary for the runtime and design time coordination of the primary elements. These common elements are also applied to the BPD element itself, so other BPDs may reference it in a hierarchical fashion.

A BPD element also contains an element holding taxonomy information to facilitate searching. The proper taxonomic classification of a BPD is absolutely necessary to obtain the value of business process reuse. The taxonomic elements contain data to identify the function and purpose of the BPI with respect to established terminological dictionaries. When a BPD is stored with taxonomical tags in a BPD repository, a BPI design tool can parse this information and make it available to developers seeking business processes of a certain type.

Within the set of common sub-elements, one is for use exclusively by a BPI design tool, and the other two are primarily for use by the BPI runtime engine. In the former category is <Description>, which provides a longhand summary of the purpose of the element and any features of note. This summary would be displayed to the developer when browsing components in a BPI component repository. The other two elements provide the means for component resolution and invocation. <URI> designates a unique resource identifier for the specific component in order that a BPI engine could locate and invoke it. This is in keeping with the overall vision that BPDL does not provide details about the components themselves, only a way of tying them together. If <URI> designates the pieces that are tied, then <Name> elements are the strings that do the tying. <Name> gives a BPI name to the component, by which other BPI-ready components can refer to it. These names need to be uniquely resolvable both within a BPD, and in the larger context of any assemblage of hierarchical BPDs.

The BPI framework enables the coordinated integration of flows, rules, and state through the employment of two fundamental concepts. The first is reciprocal abstract invocation. This refers to the ability of flows, rules, and state engines to invoke each other through named references passed to the BPI framework. It is certainly possible for flows, rules, and/or state to be wired together without taking advantage of BPI technology: for example, a flow could call a rule to determine which flow path to take; a rule could request a state transition if the rule evaluates as false; and a state transition can trigger a flow execution to provide complex logging of the transition. But the drawback of this direct-reference strategy is that the coordination is static, with the specific references built into the flows, rules, and state machines. BPIs abstract this relationship, and the BPI-ready flows, rules, and state machines reference each other by BPI name, not address. If we look at a BPDL document describing a given BPI, we will see entries like the following:

<RuleSet>
    <Name>MajorClientRule</Name>
    <Description>is this client a major client?</Description>
    <URI>http://fauxuri.reuters.com/crm/client/categorize.asmx</URI>
</RuleSet>

An example of direct invocation will be, if a flow need to invoke the ruleset above, the flow would have to include an instruction to call "http://fauxuri.reuters.com/crm/client/categorize.asmx". Later, when another more sophisticated version of the ruleset became available at "http://fauxuri.reuters.com/crm/client/new-categorize.asmx", the flow itself would have to be changed to utilize it. However, in the BPI framework, this is avoided by never calling the ruleset directly, but by instead asking the BPI engine to invoke ruleset "MajorClientRule". To utilize the new ruleset, no change to the flow is needed, only a change to the BPDL document.

The second concept is mutual data accessibility between flows, rules and state machines. All should be able to reference, evaluate, and modify the same copy of the business data while they execute. The importance of this should be obvious: if during the course of a business process, a flow engine, for example, modifies a particular piece of data, a subsequent call to, say, a rule engine will need to be aware of that change to evaluate the rule correctly. To help manage data, BPI uses the construct "entity" to separate the data from the business process. Rather than a requesting data from a particular location as a primitive flow might, the BPI-ready flow requests data from a BPDL-described entity. The BPI framework leverages state machine's capabilities to manage the lifecycle of data; thus, an entity will be associated with a state machine to provide for its instantiation, state progression, and destruction.

With reciprocal abstract invocation and mutual data access providing usable but flexible connections between a BPDL-described set of flows, rules, and states, the BPDL can fulfill its stated purpose of embodying a logical set of business requirements in its fullness. Additionally, BPDLs can be hierarchical, referencing each other in BPDL by name in the same fashion that a named flow can call a named rule. Thus, individual BPIs can be stacked and arranged together to form higher order BPIs automating larger business processes.

Named references not only allow for runtime resolution of processes and entities, but for design-time dependency analysis as well. As components get added to a BPD, a BPI Designer can indicate what other named flows, rules, state machines, and entities the component refers to, and direct you to associate other components with the BPI until no hanging references remain. With every internal reference to named components verified against BPI names in the BPDL document, the designer can be assured of runtime consistency.

The real elegance of the BPI framework is its use of these features to capture the essence of business requirements in the manner in which they were intended, without burying them into the constraints of a single implementation technology. A process best expressed as a flow can be, while another perhaps best embodied as a rule may be so without sacrificing the capabilities of each to work together. Furthermore, it permits subsequent changes to the choices of components used to fulfill those requirements to be made at minimum cost. By increasing the impedance between business requirements and technology implementation and decreasing the cost of subsequent evolution of those requirements, the BPI framework makes possible a new level of maturity in building business solutions 6.3.1 Flow Specifications A business process involves several actors, either human beings or computer services, performing activities collaboratively to achieve some business goals. The control logic and the data flow among the activities are generally coordinated by a controller. The control and data flow logics of a business process can be shown graphically as in Example 1 (FIG. 2), and Example 2 (FIG. 3).

The control flow and data flow of the business processes can be defined in a workflow specification language. If we model each task as a web service that can be described by WSDL, then a web service orchestration language, such as BPEL4WS, can be used to define the workflow of a business process.

We assume the following constructs from BPEL4WS are used to construct a workflow. Note that though BPEL4WS is used as the basis of BPD flow specification, other workflow or web service based specifications can also be used if they are based on constructs of similar semantics.

Invoke

An operation invokes a web service or another workflow by assigning values to the parameters.

```
<invoke operation="negotiate.Contact">
<arguments>
<argument index="1">
<name> ... </name>
<value> ... </value>
</argument>
<argument index="2">
<name> ... </name>
<value> ... </value>
</argument>
...
</arguments>
</invoke>
```

The invocation of a task is different from the invocation of a web-service as in BPEL4WS. A web-service end point in WSDL is based on message passing and does not have semantics defined. A task has semantics and a set of parameters.

Assignment

Assign value to a location.

```
<assign>
<from> ... </from>
<to> ... </to>
</assign>
```

Signaling Faults

<throw> name </throw>

Termination

Terminate the execution.

Waiting

Wait a certain amount of time.

<wait time=" "/>

Doing Nothing

An empty operation does nothing.

<empty/>

Structured Activities

Simple activities can be put together to build complex activities. The following constructors can be used to construct complex activities. Before or after each activity or activity block, an assertion can be added to assure the workflow state satisfies some correctness criteria:

Sequential Constructor

A sequential constructor executes several activity blocks sequentially.

```
<sequential>
<!- activity block 1 -->
<!- activity block 2 -->
... ...
</sequential>
```

Concurrent Constructor

A concurrent constructor executes several activity blocks concurrently. The constructor terminates when all concurrent activities terminate. The flow element is used to specify a concurrent constructor. Links define the dependencies among the activity blocks.

```
<flow>
activity blocks
<links>?
<link name="ncname">+
</links>
</flow>
```

Branching Constructor

A branching constructor executes one of several activity blocks. When that block terminates the constructor terminates. A condition is specified for each block as an assertion. Only when the condition evaluates to true can the block be started. If more than one condition evaluates to true, more than one block can be chosen to start. In this case a block is chosen non-deterministically from among those with true conditions.

```
<switch>
<case>
<condition>
<formula> ... </formula>
</condition>
<activity> ... </activity>
</case>
<case>
<condition>
<formula> ... </formula>
</condition>
<activity> ... </activity>
</case>
<otherwise>
activity
</otherwise>
</switch>
```

While Constructor

A while constructor executes the activity block inside the loop while the guarding condition is true. It repeats executing the activity block until the condition evaluates to false.

```
<while>
  <condition>
    <formula> ... </formula>
  </condition>
  <activity> ... </activity>
</while>
```

Race Constructor

A race constructor starts several tasks concurrently, but only the one that finishes first takes effect. Other activity blocks will be aborted.

```
<race>
          activity blocks
</race>
```

Exception Handling Constructor

Exception conditions can be specified as a global condition and a handler as a sub-flow to handle the condition. When the condition becomes true, the current executing sub-flow will be stopped and the handler will be executed. The handler can then throw new exceptions to the outer block. Unhandled exceptions will be thrown out the outer block automatically. This provides a structural way to handle failures or exceptional events that could be produced from any tasks in a sub-flow, as shown the above example. To specify exception situation in a workflow specification, we use the following notation:

```
<catch>
  <condition>
  ...
  </condition>
  <activity>
  ...
  </activity>
</catch>
```

Event

An event is generated either because a timer times out or an external message is received by the workflow controller.

```
<event>
  <name>
  ...
  </name>
  <type>
  ...
  </type>
</event>
```

Pick

Choose one path to execute depending on which event happens first.

```
<pick>
  <OnEvent>
    <name> ... </name>
    <activity>
    ...
    </activity>
  </OnEnvent>
</pick>
```

6.3.2 Semantics of Actions

The following sections describe the Semantics of Actions in the Business Process Framework.

6.3.2.1 Introduction to SemanticL

A mathematical model is developed to formally specify the semantics of a workflow. A declarative language, SemanticL, based on the model is designed to formally specify the semantics of BPI flows.

In a BPD specification of a business process, the flow is specified declaratively using an XML-based workflow language. Many workflow specification languages have already been proposed, such as BPEL4WS, WSCL, etc. BPEL4WS is chosen to be the flow description language in BPD. Those languages are adequate to describe the control flow logic of a business process. However, none have provided a way to describe their semantics, or exact "meaning". Therefore, correctness can not be guaranteed by the system automatically, but relies on manual testing.

SemanticL is not meant to be yet another workflow specification language, but a language used to annotate workflow specifications to formally define the semantics of the workflows and their components. SemanticL is based on a rigid mathematical model, so that semantic correctness can be automatically verified at design time and run time. In addition, new workflows can be automatically constructed based on a library of semantically well-defined components and business goals of the new workflows.

6.3.2.2 Formal Model for Describing Workflow Semantics

A formal workflow model is described. The semantics of a workflow can be precisely defined based on the model. In this model, a workflow specification is abstracted at a high level to facilitate logic representation and reasoning. The abstracted workflow specification is called A-BPD. An A-BPD is defined as a 4-tuple: <workflow database, task library, workflow>. The definition of each term and their relationship to BPD flow is described later.

Definitions domain, variable, and constant: A domain is a finite set of objects of the same type. For example, $D=\{1, 2, \ldots, 100\}$ represents a domain of integers from 1 to 100. A takes its value from a particular domain. For example, $x \in D$ defines a variable x on domain D. Constants are interesting values on a domain. For example, 10 is a constant in D and TRUE, FALSE are constants in the domain Boolean.

predicate: Predicates asserts some properties of an object or relations of objects. A predicate is in the form $P(x_1, x_2, \ldots, x_k)$. The number of parameters and the type of each parameter is predefined for each predicate. A predicate that does not take any parameters can be represented as a symbol that evaluated to either true or false. If P is a predicate, $P \in \{T, F\}$.

Predicates are used to characterize the current state of the workflow. For example, Contacted is a predicate in the negotiation workflow. It evaluates to true if trader A contacts B successfully, false otherwise.

literal: A literal is either a predicate or the negation of a predicate.

literal:={predicate|¬ predicate} workflow database: The set of predicates that make up the workflow forms the workflow database. Workflow database is directly related to the abstract data model in BPDL. A leaf element in the abstract data model corresponds to a predicate in the workflow database. The predicates are globally visible to all the tasks. For example the following is the workflow database for the negotiation example:

{Contacted, Accepted, NewBid_A, NewBid_B, Interrupt_A, Interrupt_B, Agreed_A, Agreed_B, Confirmed_A, Confirmed_B, Settled_A, Settled_B, Nodeal, SameBranch}.

formula: A formula is a well-formed first order logic formula based on a given workflow database. To be specific:
1. A predicate is a formula.
2. If P, Q are formulas, then P∨Q, P∧Q are formulas.
3. If P is a formula, then ¬ P is a formula.
4. If P is a formula and x is a variable, then ∀(x)P and ∃(x)P are formulas.

task: Tasks are building blocks of a workflow. A simple task is a task that performs an atomic action that satisfies the ACID property. A complex task is composed of other tasks as a sub-workflow, and therefore is not atomic. When two complex tasks are running concurrently, their activities may interleave in an arbitrary way. We will initially assume no interference and we will return to this issue later.

A simple task T is described by {P}T{Q}. P is the precondition of T. T execute correctly if and only if P is true when it started. For simplicity, we only consider P in the form of a conjunct of literals:

P:=∧ (literal).

In the case that T can be started in several different states:
{$P_1 \vee P_2$}T{Q},
We can view T as a set of tasks:
{($P_1$)$T_1${Q}, {$P_2$}$T_2${Q}.

Q is the postcondition of T. Task T can have several possible termination states, and one is non-deterministically chosen when it finishes. Q is of the form $(S_1 \wedge Q_1) \vee (S_2 \wedge Q_2), \ldots, \vee (S_n \wedge Q_n)$, where $Q_i$ is a conjunct of literals, and $S_1, S_2, \ldots, S_n$ are status variables observable by the workflow controller. One and only one of $S_1, S_2, \ldots, S_n$ is true when T finishes, and is chosen non-deterministically by the task. For simplicity, we represent $(S_1 \wedge Q_1) \vee (S_2 \wedge Q_2), \ldots, \vee (S_n \wedge Q_n)$ as $Q_1, Q_2, \ldots, Q_n$.

For example, a task Negotiate_A is described as:
{newbid_B∨interrupt_A}Negotiate_A{(newbid_A∧¬newbid_B), agreed_A, nodeal}.

The task definition follows the frame semantics. Frame semantics means that executing a task only affects the predicates mentioned in the postcondition. Formally, frame semantics can be defined by the Result function:

P' is the workflow state when T starts, and P'⇒P is true, then when T terminates Result(P',$Q_i$) is true, where
Result(P',$Q_i$)=(P'/$Q_i$)∧$Q_i$, where (P'/$Q_i$) is P with all the predicates named in $Q_i$ deleted.
Result(P',$Q_1$), Result(P',$Q_2$), ..., Result(P',$Q_n$) defines all the possible workflow states when T finishes.

Or we can reason backwards from the state where T finishes. Suppose when T finishes, Q' is true, where Q⇒Q',
Residue(Q', Qi)=∧ (Q'−Qi), where Q'−Qi is the set difference of the sets of literals in Q' and Qi.
P∧Residue(Q',$Q_1$)∧Residue(Q',$Q_1$), ..., ∧Residue(Q', $Q_1$) should be satisfied when T starts.

A BPDL specification of a task can be translated into an A-BPD specification easily according to the relationship between abstract data model and workflow database.

Workflow Specification:

A workflow is specified in the following form:
{$P_1, P_2, P_3, \ldots P_n$}WF{$Q_1, Q_2, Q_3, \ldots Q_n$}
Where $P_1, P_2, \ldots, P_n$ are conjunctions of literals and mutually exclusive. $Q_1, Q_2, \ldots, Q_n$ are in the form
$[(S_{11} \wedge Q_{11}) \vee (S_{12} \wedge Q_{12}) \vee \ldots)], [(S_{21} \wedge Q_{21}) \vee (S_{22} \wedge Q_{22}) \vee \ldots], \ldots [(S_{n1} \wedge Q_{n1}) \vee (S_{n2} \wedge Q_{n2}) \vee \ldots]$ Which means one of WF's precondition should be true when it starts and if $P_1$ is true then $Q_1$ is the postcondition and so on.

A task is a special case of a workflow specification in that it has only one precondition and postcondition pair.

Workflows are constructed from tasks using workflow constructors. If the complete construction is given, the frame semantics of the workflow can be derived and the workflow can be treated as a task.

Semantics of Workflow Constructors

We allow the following constructors in a workflow specification.

Task

If the workflow is in state P and a task $T_1$ is executed, then we have the following inference rule:

$$\frac{\{P_1\}T_1\{Q_1\}, P \Rightarrow P_1}{\{P\}T_1\{Result(P, Q_1)\}}$$

When reasoning from backward, $$\frac{\{P_1\}T_1\{Q_1\}, Q_1 \Rightarrow Q}{\{P_1 \wedge Residue(Q, Q_1)\}T_1\{Q\}}$$

Sequential

A sequential constructor specifies two tasks execute sequentially: SEQ[$T_1,T_2$] means $T_1$ is executed and then $T_2$. We have the following inference rules for sequential constructors:

$$\frac{\{P_1\}T_1\{Q_1\}, \{P_2\}T_2\{Q_2\}, P \Rightarrow P_1, Q_1 \Rightarrow P_2}{\{P\}SEQ[T_1, T_2]\{Result(Result(P, Q_1), Q_2)\}}$$

$$\frac{\{P_1\}T_1\{Q_1\}, \{P_2\}T_2\{Q_2\}, Q_1 \Rightarrow P_2, Q_2 \Rightarrow Q}{\{P_1 \wedge Residue(Residue(Q, Q_2), Q_1)\}SEQ[T_1, T_2]\{Q\}}$$

AND

The constructor AND[$T_1,T_2$] specifies the two tasks execute concurrently: We have the following inference rules for and constructors provided there is no interference:

$$\frac{\{P_1\}T_1\{Q_1\}, \{P_2\}T_2\{Q_2\}, P \Rightarrow P_1, P \Rightarrow P_2}{\{P\} \ AND \ [T_1, T_2]\{Result(P, Q_1 \wedge Q_2)\}}$$

$$\frac{\{P_1\}T_1\{Q_1\}, \{P_2\}T_2\{Q_2\}, Q_1 \wedge Q_2 \Rightarrow Q}{\{P_1 \wedge Residue(Q, Q_1 \wedge Q_2)\} \ AND \ [T_1, T_2]\{Q\}}$$

OR

The constructor OR[$T_1,T_2$, C] specifies that if C is true, then $T_1$ is executed otherwise $T_2$ is executed. We have the following inference rules:

$$\frac{\{P_1\}T_1\{Q_1\}, \{P_2\}T_2\{Q_2\}, (P \wedge C) \Rightarrow P_1, (P \wedge \neg C) \Rightarrow P_2}{\{P\} \text{ OR } [T_1, T_2, C]\{\text{Result}(P \wedge C, Q_1) \vee \text{Result}(P \wedge \neg C, Q_2)\}}$$

$$\frac{\{P_1\}T_1\{Q_1\}, \{P_2\}T_2\{Q_2\}, C, Q_1 \Rightarrow Q, Q_2 \Rightarrow Q}{\{(C \wedge P_1 \wedge \text{Residue}(Q, Q_1)) \vee (\neg C \wedge P_2 \wedge \text{Residue}(Q, Q_2))\} \text{ OR } [T_1, T_2, C]\{Q\}}$$

RACE

A race constructor RACE[$T_1$,$T_2$] specifies two tasks running concurrently. However, the first to finish will commit and the other one will be aborted.

$$\frac{\{P_1\}T_1\{Q_1\}, \{P_2\}T_2\{Q_2\}, P \Rightarrow P_1, P \Rightarrow P_2}{\{P\} \text{ RACE}[T_1, T_2]\{(S \wedge \text{Result}(P, Q_1)) \vee (\neg S \wedge \text{Result}(P, Q_1))\}}$$

$$\frac{\{P_1\}T_1\{Q_1\}, \{P_2\}T_2\{Q_2\}, Q_1 \wedge Q_2 \Rightarrow Q}{\{P_1 \wedge (\text{Residue}(Q, Q_1) \vee \text{Residue}(Q, Q_2))\} \text{ RACE }[T_1, T_2]\{Q\}}$$

LOOP

A loop constructor LOOP[$T_1$,C] specifies the task $T_1$ will be executed repeatedly until C becomes true, where C is a well-formed formula. The loop concerned here is a repeat loop, in the sense that the loop body $T_1$ is executed at least once. A while loop can be constructed easily using a repeat loop and an OR constructer.

Due to the fact that the loop condition C and the task $T_1$ are both specified as logical formulas, the loop constructor is less powerful than the loop in a general programming language. The reason is because no matter how many times the loop body is executed, when we reach the starting point of the loop constructor, the workflow state will always be the same. The loop invariant is simply $P_1 \wedge C$. The semantics of the loop constructor is retrying $T_1$ until it gives us the desired output, assuming $T_1$ has several non-deterministic outputs.

$$\frac{\{P_1\}T_1\{Q_1\}, P \Rightarrow P_1, \text{Result}(P, Q_1 \wedge C) \Rightarrow P_1}{\{P\} \text{LOOP}[T_1, C]\{\text{Result}(P, Q_1 \wedge \neg C)\}}$$

$$\frac{\{P_1\}T_1\{(S \wedge Q_a) \vee (\neg S \wedge Q_b)\}, Q_a \Rightarrow P_1, Q_b \Rightarrow Q}{\{P_1 \wedge \text{Residue}(Q, Q_b)\} \text{LOOP}[T_1]\{Q\}}$$

A necessary condition for a well formed loop is that the postcondition of the loop does not have a contradiction:

¬C∧$Q_1$≠False

This happens to be a necessary condition for the termination of the loop. If we assume of $T_1$'s output satisfies the fairness property, then the condition is also sufficient.

Event and Pick

An event is a special kind of task. An event is a message sent to the workflow controller from outside. The workflow controller has no control of when an event happens. However, the workflow controller will recognize the events that are registered with it and response to it accordingly, such as starting a new workflow instance or continue a waiting workflow that is waiting for the event to happen. An event can be specified as a task with precondition as true.

{TRUE}E{Q}.

Event cannot be used in a workflow specification. Instead, a constructor called Pick is used to specify the workflow is waiting for some event to happen. A pick can have one or several Receive clauses. Depending on which event comes first, one block will be picked up and executed.

The semantics of a Pick constructor is similar to that of a Race, assuming that exactly one of the waiting events will eventually happen.

$$\frac{\{\text{TRUE}\}E_1\{Q_a\}, \{\text{TRUE}\}E_2\{Q_b\}, \{P_1\}T_1\{Q_1\},}{\{P_2\}T_2\{Q_2\}, \text{Result}(P, Q_a) \Rightarrow P_1, \text{Result}(P, Q_b) \Rightarrow P_2}$$
$$\overline{\{P\} \text{PICK}[\text{RECEIVE}[E_1, T_1], \text{RECEIVE}[E_2, T_2]]}$$
$$\{(S \wedge \text{Result}(\text{Result}(P, Q_a), Q_1)) \vee (\neg S \wedge \text{Result}(\text{Result}(P, Q_b), Q_2))\}$$

$$\frac{\{\text{TRUE}\}E_1\{Q_a\}, \{\text{TRUE}\}E_2\{Q_b\}, \{P_1\}T_1\{Q_1\}, \{P_2\}T_2\{Q_2\}, Q_1 \Rightarrow Q, Q_2 \Rightarrow Q}{\{\text{Residue}(P_1 \wedge (\text{Residue}(Q, Q_1), Q_a) \vee \text{Residue}(P_2 \wedge (\text{Residue}(Q, Q_2)), Q_b)\}}$$
$$\text{PICK}[\text{RECEIVE}[E_1, T_1], \text{RECEIVE}[E_2, T_2]]\{Q\}$$

6.3.2.3 Semantics of Actions

Data Model:

The data model defines the data schema underlying a business application or a set of related business applications. In addition, describes the abstract data model on which the semantics of the tasks and workflows are defined.

The data model is defined as semi-structured data types based on XML-Schema. There are many industry standards, such as FpML and NewsML, which are based on XML-Schema. They form the basis for many applications.

BPDL provides notations of both a concrete data model and an abstract data model. The concrete data model is the actual data model that a workflow controller uses at run time, whereas the abstract data model specifies only some high-level information that is required for semantic specification, verification and simulation purpose.

Concrete Data Model

The concrete data model defines the data schema that is required for workflow execution.

For example, the data model of a negotiation process can be defined as shown in 7.2, in the form of XML-Schema. This can be considered as an extended version of the FPML standard. An instance of the negotiation data model is illustrated in 7.3.

Abstract Data Model

The abstract data model is an abstraction layer on top of the concrete data model. It defines the properties that would be used to specify the pre and post conditions of tasks and workflows. For example, a predicate called Confirmed is defined for a trader. Confirmed is true if the trader's deal is already confirmed, false otherwise.

```
<property                              name="confirmed"
expression="(negotiation/CurrentBid/bidder/confirmed    =    yes)    or
(negotiation/CurrentBid/listener/confirmed = yes)"/>
```

The properties are defined as XPATH expressions on the concrete data model that evaluate to Boolean or integer values. For example, confirmed is defined as at least one trader reached the confirmed state. An example is shown in 7.4.

Task and Task Library

Tasks are building blocks of workflow process. Tasks are generally specified as a web-service interface with WSDL. Semantics of a task is specified in the form of pre and postconditions.

A task has a set of preconditions. The preconditions have to be satisfied when the task starts executing. The pre and post conditions are Boolean expressions on the abstract data model. The execution body of a task can be either an application outside the workflow engine (simple task) or a sub-workflow (complex task).

Requires

Requires specifies the pre-conditions of a task. It can have one or several require elements. Each require element has a set of formula elements. The formula element is a Boolean XPath expression on the abstract data model. A require element is satisfied if and only if all the contained formula elements are true. At least one of the require element should be satisfied before starting the execution of the task.

```
<requires>
    <require>
    <formula> negotiation/SingleConfirm
    </formula>
    </require>
</requires>
```

Guarantees

The Guarantees element specifies the post-conditions of the task. Similar to the require element, each guarantee also has a set of formula elements. When the task finishes successfully, one and only one of the guarantee elements is chosen as the output, and the workflow data is guaranteed to be updated accordingly so that the XPath formula evaluates to true. In addition, only fields explicitly specified in guarantee are affected by the task and other fields in the abstract data model are not changed.

```
<guarantees>
    <guarantee>
    <formula> negotiation/DoubleConfirm = true
    </formula>
    </guarantee>
<guarantees>
```

Exceptions

Exceptions specify the exceptional post-conditions of the task as an XPath expression. It is similar to the guarantees specification. The only difference is that it defines the possible output when a task fails or exits abnormally.

```
<exceptions>
    <exception>
    <formula> negotiation/timeout </formula>
    </exception>
<exceptions>
```

6.3.2.4 Semantics of Workflow Requires and Guarantees

In a manner similar to a task specification, a workflow specification can have requires, guarantees and exceptions, which are the same as in a task specification.

Constructors

Constructors follow the syntax in BPEL4WS in general, and we provide a way to annotate them with assertions.

```
<assert>
    <formula> XPath expression on the abstract data model </formula>
</assert>
```

6.3.3 Assertions at Different Points in the Workflow
6.4 BPI Execution Framework The following sections describe the BPI execution framework.

6.4.1 Flow, Rule and State Engines

BPI Execution Framework has three core components: flow engine, rule engine and state engine. The three engines interact with each other and invoke existing domain services during an execution of a business process.

Domain services provide domain specific functionalities as web services. For example, Customer Relation Management Services provides functions related to managing customer relations, such as retrieving customer information, searching customer directory, etc. Domain services provide building blocks that can be integrated into new applications.

Flow engine orchestrates web services according to a given workflow specification in the form of a BPEL4WS program. When a workflow is deployed at a flow engine, unique entry point(s) of that flow is created as web services. A new instance of flow execution will be created and started when a message is received in the corresponding entry point. During the execution, the flow may invoke domain services to perform domain specific functions, invoke rule engine to evaluate rules and invoke state engine to request state query or transition. Since flows are deployed as web services, they can be invoked by other flows.

State engine manages business object life cycle based on state machine models. State engine controls the state data and user-defined data of a business object instance at run time. Those data cannot be updated outside the state engine. State machine models define the legitimate states, transitions between states, and operations associated with transitions of a business object. At run time, new instances of a state machine will be created according to the model when a create request is received. When requests for transitions on state machine instances are received, the state engine will first verify the requested transitions are enabled. If enabled, the state data will be updated accordingly and the associated operations, such as user data update or web service invocation, will be performed. A state engine has a single web service interface for all the state machine models.

Rules engine evaluates complex business rules and can possibly perform some actions depending on what rules are evaluated to true. Business rules are specified in a declarative language, such as RuleML. At run time, a rules engine will evaluate a set of rules on a set of data at request. Like the state engine, rules engine exports only a single web service interface for all rule evaluation requests 6.4.2 Coordination between BPI Flows, Rules and States A business process execution requires that flows, rules and state coordinate and interact with each other. However, engines of flows, rules and states can execute independently.

They are loosely coupled together through web service interfaces. FIG. 1 shows the logical relationship among their interfaces. Hard lines with arrows in the graph show the invocation relationship among different interfaces, and dashed lines show data flow relationship.

Each flow has its own unique web service interface. For example, F1 has interface IFlow1; F2 has interface IFlow2; and F3 has interface IFlow3. The rules engine has a single interface. Requests for evaluating R1, R2, and R3 all go through the same interface. State engine also has only a single interface. Query or updates on all state instances are requested through that interface.

During execution of a flow, rules engine can be invoked to do rule evaluations and state engine can be invoked to do state transition and data update. Rules engine can start a flow or invoke the state engine as triggered by the results of some rule evaluations. State engine can call the rules engine or start a flow if a transition is successfully performed. The reciprocal invocability of the three is shown in FIG. 1 by the arrows L1, L2 and L3.

Business object data is guarded by the state machine and can only be written or updated through the state machine. This guarantees the data will stay in legal states and can only be changed via legal transitions. Flows and rules can operate on unguarded data and can perform read-only operations on guarded data. Optionally, to improve performance, guarded data can be replicated into a read-only data store.

6.4.3 Management of BPIs

As BPIs are deployed in ubiquitous compute environment, the management of BPIs becomes vital. The BPI management consists of registry, discovery, monitor, Service Level Agreement (SLA) managements and autonomic fulfillment of SLAs (Management BPIs and End Point Resolution) when violations occur. The following sections will discuss each of these aspects in detail. FIG. 9 provides the diagrammatic representation of BPI management. A point to note here is that the management of BPI is a business process and that is automated by using BPIs, which are referred as management BPIs.

6.4.3.1 BPI Registry:

The BPI registry consists of three parts. One, the end points of the BPIs (either logical or physical) and the second, the SLAs agreements and the third the Taxonomies. Either a central or federated registry is required to store this information. The semantics of the BPI registry are: Each of the BPIs and its constituent (flows, rules and states) are mapped in to abstract interfaces. Each of the abstract interfaces has one or more instances of run time endpoints. Each of the runtime instances will have instance data where the various SLAs, configuration and taxonomies are defined. Any persistence store can be used as BPI registry. The following paragraph describes how UDDI can be used as BPI Registry:

6.4.3.2 BPI Registry using UDDI:

Each of the BPIs and its constituents are mapped into UDDI tModels.

The description of BPIs and its constituents is mapped to UDDI overview document The SLA agreements, configuration and Taxonomies are mapped to UDDI instance data The BPI Taxonomies are mapped to UDDI Taxonomies 6.4.3.3 BPI Discovery.

After the BPIs are deployed based on the configuration stored in the registry (described above), there is always a risk of deployment and the registry being out of sync because of their disconnected nature. This problem is solved by monitoring the traffic to the BPI endpoints and provide feedback to the BPI administrator, an ability to either sync up the registry or identify rouge BPIs running in the environment.

6.4.3.4 BPI Monitor

Since BPI end points are SOAP end points, the messages are monitored for various characteristics of SLAs in either real time or near real time (for performance reasons). When violations occur, the monitoring agents notify "Management BPIs" to take appropriate actions.

6.4.3.5 Management BPIs

Management BPIs are special BPIs that receive the SLA violations (described above) and make decisions on fulfilling the SLAs. Taking a simplistic example, when a particular flow service reached 80% of its capacity the, BPI Monitor notifies the Management BPI and the Management BPI adjusts configuration in the BPI registry such that subsequent calls to the flow service is routed using End Point Resolution service to a different end point till the first one can sustain the SLA. The management BPIs also provide "SLA tolerance and sustain management" to avoid feedback based oscillations.

6.4.3.6 End Point Resolution Service

At BPI runtime, every BPI constituent when it needs an endpoint, queries the BPI registry based on the interface, SLAs and classifications and gets the end point that needs to be invoked. This provides dynamic discovery of endpoints and provides the ability to reroute the BPI calls based on the configuration adjustment carried out by the Management BPIs in order to fulfill SLAs.

6.5 Correctness of Business Process Workflow

A workflow is correct according to the given requirement if the postcondition of the workflow requirement is asserted to be true by the workflow specification, suppose the precondition of the workflow is true when it starts.

Based on the semantics of tasks and the inference rules of workflow constructors, correctness of a workflow can be verified at compile time.

6.5.1 Automatically Annotate a Workflow

Given a workflow precondition, assuming each task's pre and postconditions are given, a workflow can be automatically annotated at every execution point of what should be true at that point.

The algorithm AutoAnnotate takes two parameters: A workflow W and a precondition P of the workflow, and output W', an annotated version of W.

Algorithm: AutoAnnotate(W, P): W'

1. IF W is a task $\{P_1\}T_1\{Q_1\}$, apply the TASK rule:

$$\frac{\{P_1\}T_1\{Q_1\}, P \Rightarrow P_1}{\{P\}T_1\{Result(P, Q_1)\}}$$

RETURN$\{P\}T_1\{Result(P, Q_1)\}$.

2. IF W is composed with a constructor W=CON($T_1$, $T_2$, . . . ), apply the corresponding constructor rule and recursively annotate $T_1$, $T_2$, . . . .

6.5.2 Automatically Verify the Correctness of a Workflow

First we annotate a workflow. Then if an assertion does not imply the precondition of the next task, there is an error at that point. The workflow is wrong because the next task's precondition is not satisfied and therefore cannot be started at that point.

If the last assertion does not imply the postcondition of the workflow, the workflow is wrong because the workflow does not satisfy the predefined postcondition.

6.6 Model Checking of Business Processes

Model checking formally verify whether a system implementation satisfies its requirement specification. Industry and academia has been developing model checking methodologies and automatic verification tools for various software and hardware systems. However, very few are applied in business processes and applications because of their complexity and lack of formal specification.

BPI provides a way to abstract a business process and describe it formally as flows, rules, and states. The correctness of flow and state specification can be verified using model checking technique. Based on this, BPI framework offers an approach to model checking the correctness of a business process. The BPI model checking tool takes the flow and state specification as the system implementation, and checks them against a set of system requirement specifications derived from the original business requirement automatically. It can be used to enforce correctness both at design time and at run time.

Model checking is different from the semantic-based verification in the following aspects: First, model checking is based on observational trace semantics, that is, the observable sequence of states in a possible process execution; whereas semantic-based verification is based on formal semantics of activities and flows. Second, the former can be used to verify temporal properties, such as A must happen before B, A eventually will happen, there is no deadlock, etc; whereas the latter cannot be used to verify such properties. Third, the former needs to explore the whole state space of a system execution; whereas the latter is based on form deduction on the system specification.

BPI model checking tool helps us to achieve the following objectives: check design time correctness, enforce runtime correctness, and ensure security. Security is especially important in a distributed environment. From the model checking perspective, security problem is a subset of reliability problem, which can be treated by language-based techniques. Our model checking tool ensures security policies for information flow and therefore guarantees confidentiality.

6.6.1 Model Checking Approach

Our model checking approach is based on abstract state machine models. Specifications are first translated into abstract state machine models and then model checked. The methodology is summarized in FIG. 10.

6.6.2 Design Time Model Checking

The first step is to formally define the system implementation and the requirement specification, both of which are derived from the business requirement. From the requirement of a Business process, BPI allows us to specify the flows in BPEL4WS and the state models in terms of StateML, which is based on a hierarchical state machine model. Those procedures are indicated in FIG. 10 as dashed arrows. In addition, business requirements are abstracted and formalized as temporal predicates in the form of temporal logic. The set of temporal predicates specifies the temporal constraints that the system has to observe. This procedure is indicated by arrow g in FIG. 10.

The second step is to define the flows and states in our hierarchic state machine model, because model checking techniques are based on hierarchical state machine model. The BPEL4WS specification is translated into StateML, which serves as the state specification language of both BPI state and model checking. An algorithm is developed to do the translation automatically. This procedure is indicated by arrow a in FIG. 10.

The third step is to abstract the system and requirement specification by mapping both hierarchical state machines and temporal predicates into Abstract State Machines. This step is necessary because the original specification may have too many states or even an infinite state space. Model checking on such a state machine will encounter state explosion problem. Abstraction simplifies the state space of the original specification. This procedure is indicated by arrow c and d in FIG. 10.

The Fourth step is model checking the abstract state machine. The result is then used to further refine the state machine models. Steps 3 and 4 are performed iteratively until the abstract state machines are successfully model checked. This procedure is indicated by arrow b, e, and f in FIG. 10.

There are two approaches for abstraction and model checking: Counter-example guided and weakest precondition guided.

In simple, counter-example guided abstraction follows the following procedure:
1. Initially set E0 to include predicates in the requirement
2. Iteratively carry out following steps:
   a. Abstract concrete model with Ei.
   b. Model checking abstract model, if answer is yes, then terminates.
   c. If answer is no, we simulate concrete model and find out new predicate Fi which caused the problem.
   d. Let Ei+1:=Fi union Ei and i:=i+1, and proceed to next iteration.

Weakest precondition guided abstraction is summarized is follows:
1. Apply requirements predicates to the concrete model.
2. Backwardly compute weakest precondition for each state based on predicates in step 1.
3. Abstract concrete model with all predicates computed.
4. Model checking the abstract model, if answer is yes, then terminate.
5. If answer is no, modify the abstraction and rerun the model checking.

6.6.3 Runtime Monitoring

Runtime monitoring guarantees the correctness of a running process. Though a process is verified at design time, runtime monitoring is still necessary. This is because: a) Some properties may not be verifiable in design time due to the abstractions; b) some activities may have undesired runtime properties that are not specified in their interface. c) Many performance and security policies have to be guaranteed at runtime.

A runtime monitor is automatically constructed based on the safety property requirements formally defined as temporal predicates. The monitor executes in parallel with the monitored system at runtime and detects any violations of the safety properties. Once a violation is detected, the monitor will interrupt the current process execution and start an error-handle procedure.

Security is ensured through language based techniques. Each data item in the specification is associated with a secure type tag, such as high or low, to indicate the security level. Each program block is associated with a security context. The model checker performs type inference analysis to make sure that information flow is consistent with the tagged values of blocks and data items. For example, all assignments to a data item tagged low are either derived from low values or take place in a low context.

6.7 Automatic Synthesis of Business workflows

A workflow requirement specifies the precondition and the expected postcondition of a workflow. A correct workflow specification, if exists, can hopefully be found out based on the semantics of a given task library.

The problem is, given a task library and a workflow requirement, a correct workflow specification is generated automatically.

To illustrate the problem, suppose we have a task library as described in FIG. 5. The tasks are components used to build a corporate action workflow.

It is easy to see that the tasks can not be arbitrarily connected, because the postcondition of one may not satisfy the precondition of another. There are a set of basic rules on how to correctly connect the tasks together using the workflow constructs.

Sequence: Suppose a task or workflow A's postcondition implies the precondition of task or workflow B, then A and B can be composed in a sequence structure. An example is shown in FIG. 6.

Branching: If the output of task A only partially implies the precondition of task B, then some output cases from A is not handled by simply forming a sequence of A and B. The outputs from A that are not handled are called dangling edges. If the conditions on the dangling edges imply preconditions on other tasks, then a branching need to be formed to handle different cases by different tasks. If a set of tasks can be found to cover all possible cases from A, then a correct branching construct can be formed. An example is shown in FIG. 7.

Loop: Sometimes a dangling edge can be fixed by feed it back to some tasks on the path and form a loop, which means we retry the sub-workflow inside the loop until a condition is satisfied. An example is shown in FIG. 8.

Exception: Exceptions are just special output edges, so they can be handled the same way as branching. The only difference is that they often imply the workflow is in some error state, and has to be dealt with separately by error handlers. In addition, same exceptions may be generated by different tasks, so that a single handler can be used for a group of them. Instead of creating branches, a catch statement is created to handle exceptions in a block.

Subflow: a synthesized workflow can be used as a component to form a larger workflow.

Based on the construction rules, all possible workflows can be constructed from a task library. However, the number can be astronomical and not all of them satisfy the business goals. An algorithm is needed to find the right workflow that satisfies given business goals.

The business goals are specified in terms of workflow preconditions and postconditions. A workflow needs to be generated such that, suppose the preconditions are true when the workflow starts, postconditions should be true when the workflow finishes.

To make the problem tractable, algorithms for special cases of the problem are first constructed, and then more general algorithms are built up based on the special cases.

Case1: Tasks has only positive predicates in preconditions and single output in postconditions.

The task library satisfies the following assumptions:
1. Task precondition is a conjunction of positive predicates.
2. No variable assignment or conditions on variables are allowed.
3. Task library follows the ranking assumption. (See below)
4. Initially, the value of all predicates is either true or false. The actual value can not be assumed by the workflow generator. The generated workflow has to work correctly in all possible cases. (No workflow precondition is given.)

Ranking: a partial order relationship< can be defined on the set of predicates PS, and the task library TS respects the partial order< in the following sense:
   a. For any task $T$ in $\mathcal{T}$, there exists a positive predicate $q\_0$ in T's postcondition. $q\_0$ is called primary output. For any predicate p in T's precondition and non-primary predicate q in T's postcondition, we have
   b. p<q\_0, q<q\_0.
   c. No predicates in $T$'s pre and post conditions have higher rank than $q\_0$. A task can have more than one primary outputs.
   d. All predicates are primary outputs of at least one task.

Path: A path is a sequence of tasks. Assuming the precondition of the first task is satisfied, all tasks in the path can be executed correctly in the sequential order.

Theorem:

Given a task library that satisfies the ranking assumption, we have the following:

For each predicate p, there exists a path Path(p). Path(p) makes p true, and p is the primary output of the last task of Path(p).
   a. If we view the Path(p) as a subworkflow, then p is the primary output of the subworkflow.
   b. No predicates with a higher rank than $p$ appears in the path.
   c. We can use the notation of attribute closure to calculate paths that implement the predicates.

Algorithm: Given a library TL, find a workflow for each particular predicate by construct the attribute closure of the library CL(TL).

The closure is all the predicates that can be made true. Each predicate $p$ is associated with a path attribute, which belongs to Path(p).

Case 2: Allowing Conditions

The case follows the same assumption as in the above section, but adds in the assumptions to handle conditions.

Additional Assumptions:

Task precondition is a conjunction of positive predicates, conditions on single variables, such as $x>0$, or a combination of both.
   a. Predicates in postcondition may be of the form gen(x). If a task postcondition has gen(x), gen(x) must be a primary output, and the only primary output of that task
   b. A variable x is not assigned when the workflow starts, that is, gen(x)=false initially.
   c. gen(x) and condition on x (x>0) have the same rank.

Path: A path is a sequence of tasks. There are possibly conditions on variables preceding some of the tasks. If the precondition of the first task is satisfied, tasks in the path can be executed correctly in the sequential order if we assume conditions preceding a task are true when the task starts.

Path(p) is a path with p as the primary output of the last task (and hence the primary output of the path). If there is no condition on a path, the path is a complete path. Otherwise, the path is a partial path. Conjunction of all the conditions along a path is condition of the path.

Given a task library that satisfies our assumptions,

For each predicate p, there exists at least one path Path(p). Path(p) can be partial.

A task producing gen(x) only needs to appear at most once in a path.

For all variables X={x\_1, x\_2, . . . , x\_n} in the task library, gen(x\_1), . . . , gen(x\_n) can be sorted into a total order which keeps the partial order of the variables' ranking. If there exists a partial path implementing p with conditions along the path $C(x\_1), C(x\_2), \l dots, C(x\_k)$, then there exists a partial path implementing p that generates each variable at most once and with the same set of conditions annotated on the path in the given total order.

For each variable x\_i, we need only one task to generate it.

Attribute Closure Algorithm:

We only need to find a partial path for each equivalent set according to the order of variables. We can achieve this by adding the following rules to the closure algorithm.

Algorithm: construct all partial paths through building the attribute closure.

Algorithm: Construct a workflow from the closure.

Case 3: Multiple Primary Outputs in Postconditions

Additional Assumptions:

A task can have more than one output, each of which is a conjunction of predicates as specified in the previous section. If a task T has multiple outputs, then each output has one and only one primary predicate. In addition, if $p\_i$, $p\_j$ are primary predicates of T's outputs, then $Rank(p\_i)$ is not higher or lower than $Rank(p\_j)$.

Case 4: Allowing Multiple Output and Negations

Extending the definition of rank:

a. Predicates can be arranged in partial order as in the previous section, and the notion of rank is extended to negations of predicates.
b. $Rank(p)=Rank(not\ p)$.
c. $Rank(p)=Rank(q)$, p not q→p=not q.

A predicate and its negation have the same rank, and it is the only case that two literals have the same rank.

The model is extended to allow some limited forms of negation in precondition, and multiple outputs.

6.8 Bpi Framework Based Applications (Possible Examples but not Limited to)

The BPI Framework can be used for a wide range of business process automation including but not limited to following financial services workflows:

6.8.1 Corporate Actions Management

Managing Corporate Actions Business Process in Custodian and Asset Management organizations requires a complex combination of business flows, rules and state management. Corporate actions workflow comprises of seven stages, e.g. data capture, event certification, entitlement, notification, decision making, account posting and settlement as independent modules. It is developed on the BPI framework and uses industry standards such as MDDL, SWIFT MT564/5 for data model and interfacing with external systems.

6.8.2 Order Management Systems Integration with Market Data, Portfolio and Compliance Applications Traditional Order Management Systems are not well integrated to other financial systems such as Market Data, Portfolio and Compliance applications. The BPI framework provides a suitable way to automate the integration workflows.

6.8.3 Data Management System

Creating an accurate repository (often known as 'gold copy') of financial data requires complex automated and human workflow. Traditionally these business workflows and rules are implemented as custom programs, where the ability to change the business logic based on market demand is an expensive and slow process. The BPI Framework provides a way to automate these business processes where business rules can be changed as required without a large impact to the rest of the systems.

7 SCHEMAS AND EXAMPLE INSTANCES 7.1 Schema1: BPDL Schema

```
<?xml version="1.0" encoding="utf-16"?>
<xs:schema                                                     targetNamespace="http://Reuters.com/BPD"
xmlns:xs="http://www.w3.org/2001/XMLSchema"
xmlns:b="http://schemas.microsoft.com/BizTalk/2003"            xmlns:rbf="http://Reuters.com/BPD"
xmlns:msdata="urn:schemas-microsoft-com:xml-msdata"            elementFormDefault="qualified"
attributeFormDefault="qualified" id="BPD">
<xs:include schemaLocation="BPDArtifactDefinition.xsd" id="rbfArtifactDefinition"/>
  <xs:element name="BPD">
  <xs:complexType>
  <xs:sequence>
  <xs:element name="Flows">
  <xs:complexType>
  <xs:sequence>
  <xs:element name="Flow" minOccurs="0" maxOccurs="unbounded">
  <xs:complexType>
  <xs:group ref="rbf:rbfArtifactDefinition"/>
  </xs:complexType>
  </xs:element>
  </xs:sequence>
  </xs:complexType>
  </xs:element>
  <xs:element name="RuleSets">
  <xs:complexType>
  <xs:sequence>
  <xs:element name="RuleSet" minOccurs="0" maxOccurs="unbounded">
  <xs:complexType>
  <xs:group ref="rbf:rbfArtifactDefinition"/>
  <xs:attribute name="MajorRevision" type="xs:unsignedInt" use="optional"/>
  <xs:attribute name="MinorRevision" type="xs:unsignedInt" use="optional"/>
  </xs:complexType>
  </xs:element>
  </xs:sequence>
  </xs:complexType>
  </xs:element>
  <xs:element name="StateModels">
  <xs:complexType>
  <xs:sequence>
  <xs:element name="StateModel" minOccurs="0" maxOccurs="unbounded">
  <xs:complexType>
  <xs:group ref="rbf:rbfArtifactDefinition"/>
```

```
</xs:complexType>
</xs:element>
</xs:sequence>
</xs:complexType>
</xs:element>
<xs:element name="Entities">
<xs:complexType>
<xs:sequence>
<xs:element name="Entity" minOccurs="0" maxOccurs="unbounded">
<xs:complexType>
<xs:group ref="rbf:rbfArtifactDefinition"/>
</xs:complexType>
</xs:element>
</xs:sequence>
</xs:complexType>
</xs:element>
<xs:element name="Taxonomies">
<xs:complexType>
<xs:sequence>
<xs:element name="RDF">
<xs:complexType>
<xs:sequence minOccurs="0" maxOccurs="unbounded">
<xs:element name="Taxonomy" maxOccurs="unbounded">
<xs:complexType>
<xs:sequence>
<xs:any processContents="skip" minOccurs="0" maxOccurs="unbounded"/>
</xs:sequence>
<xs:attribute name="name"/>
</xs:complexType>
</xs:element>
</xs:sequence>
</xs:complexType>
</xs:element>
</xs:sequence>
</xs:complexType>
</xs:element>
<xs:group ref="rbf:rbfArtifactDefinition"/>
<xs:element name="SubBPDs">
<xs:complexType>
<xs:sequence minOccurs="0" maxOccurs="unbounded">
<xs:element name="BPD">
<xs:complexType>
<xs:group ref="rbf:rbfArtifactDefinition"/>
</xs:complexType>
</xs:element>
</xs:sequence>
</xs:complexType>
</xs:element>
<xs:element name="Views">
<xs:complexType>
<xs:sequence minOccurs="0" maxOccurs="unbounded">
<xs:element name="View">
<xs:complexType>
<xs:group ref="rbf:rbfArtifactDefinition"/>
</xs:complexType>
</xs:element>
</xs:sequence>
</xs:complexType>
</xs:element>
</xs:sequence>
</xs:complexType>
</xs:element>
</xs:schema>
```

7.2 XML-Schema Specification of the Concrete Data Model of the Negotiation Process

```
<xsd:schema xmlns:xsd="http://www.w3.org/2001/XMLSchema"
    targetNamespace="http://www.NegotiationML.org"
    xmlns="http://www.NegotiationML.org"
    elementFormDefault="qualified">
<xsd:ComplexType name="NegotiationsType">
    <xsd:element name="negotiation" type="negotiationType"
        maxOccurs="unbounded"/>
</xsd:ComplexType>
```

```
</xsd:ComplexType name="negotiationType">
    <xsd:element name="id" type="integer"/>
    <xsd:element name="CurrentBid" type="bidType"/>
    <xsd:element name="BidHistory" type="bidType"
        minOccurs="0" maxOccurs="unbounded"/>
</xsd:ComplexType>
<xsd:ComplexType name="bidType">
    <xsd:element name="id" type="integer"/>
    <xsd:element name="bidder" type="traderType"/>
    <xsd:element name="listener" type="traderType"/>
    <xsd:element name="details" type="FpML"/>
```

-continued

```
</xsd:ComplexType>
...
</xsd:schema>
```

7.3 An Instance of the Negotiation Data Model

```
<Negotiations>
  <Negotiation>
    <Id> 101 </Id>
    <CurrentBid>
      <Id> 1 </Id>
      <bidder>
        <Id> 1 </Id>
        <name> A </name>
        <branch>NYC</branch>
        <Initiated>NO</Initiated>
        <Agreed> value="NO"></Agreed>
        <Negotiating>NO</Negotiating>
        <Confirmed>NO </Confirmed>
      </bidder>
      <listener>
        <Id> 2 </Id>
        <name> B </name>
        <branch>LONDON</branch>
        <Initiated>NO</Initiated>
        <Agreed> value="NO"></Agreed>
        <Negotiating>NO</Negotiating>
        <Confirmed>NO </Confirmed>
      </listener>
    </CurrentBid>
    <BidHistory>
      ...
    </BidHistory>
  </Negotiation>
</Negotiations>
```

7.4 Example of High-Level Data Model

```
...
<property name="SingleConfirmed" expression="
(negotiation/CurrentBid/bidder/confirmed = yes) xor
(negotiation/CurrentBid/listener/confirmed = yes"/>
<property name="DoubleConfirmed" value="
(negotiation/CurrentBid/bidder/confirmed = yes) and
(negotiation/CurrentBid/listener/confirmed = yes"/>
...
```

Aspects of the present invention have been described in terms of illustrative embodiments thereof. Numerous other embodiments, modifications and variations within the scope and spirit of the appended claims will occur to persons of ordinary skill in the art from a review of this disclosure.

TOC

Business Process Automation . . . 1
1 Field of the Invention . . . 1
2 Background of the invention . . . 1
3 Summary . . . 3
4 Brief Description of the Figures . . . 5
5 Detailed Description . . . 6
    5.1 Decomposition of a Business Process into Flows, Rules and States (FRS) . . . 8
    5.2 Taxonomy of BPD and constituent Flows, Rules and States . . . 13
    5.3 Declarative Specification of BPIs . . . 13
    5.3.2 Semantics of Actions . . . 21
    5.3.3 Assertions at different points in the workflow . . . 32
    5.4 BPI Execution Framework . . . 32
    5.4.1 Flow, Rule and State Engines . . . 32
    5.4.2 Coordination between BPI Flows, Rules and States . . . 33
    5.4.3 Management of BPIs . . . 34
    5.5 Correctness of business process workflow . . . 36
    5.5.1 Automatically annotate a workflow . . . 36
    5.5.2 Automatically verify the correctness of a workflow . . . 37
    5.6 Model Checking of Business Processes . . . 37
    5.6.1 Model Checking Approach . . . 38
    5.6.2 Design Time Model Checking . . . 38
    5.6.3 Runtime Monitoring . . . 40
    5.7 Automatic synthesis of Business workflows . . . 40
    5.8 BPI Framework based Applications (possible examples but not limited to) . . . 45
    5.8.1 Corporate Actions Management . . . 45
    5.8.2 Order Management Systems Integration with Market Data, Portfolio and Compliance Applications . . . 45
    5.8.3 Data Management System . . . 45
6. Schemas and Example Instances . . . 47
    6.1 Schema 1: BPDL Schema . . . 47
    6.2 XML-Schema specification of the concrete data model of the negotiation process. 49
    6.3 An instance of the Negotiation Data Model . . . 50
    6.4 Example of high-level data model . . . 51
7. Claims . . . 52

9 BACKGROUND OF THE INVENTION

A process and system for automating business functions is described.

The invention claimed is:

1. A method, comprising:
receiving, by a computing device, first business logic expressed in one or more declarative languages, the first business logic including a first process description, the first process description describing a first process of a business process instance in terms of one or more flows;
receiving, by the computing device, second business logic expressed in the one or more declarative languages, the second business logic including a second process description, the second process description describing a second process of the business process instance in terms of one or more rules, the second process being different from the first process; and
executing, by the computing device, the first business logic and the second business logic,
wherein the business process instance is associated with one or more states,
wherein each of the one or more flows represents a control flow between business functions,
wherein each of the one or more states represents a legal state transition for at least one business entity, and
wherein each of the one or more rules represents a business rule or policy enforced on the at least one business entity in an externalized form.

2. The method of claim 1,
wherein the first or second process includes one or more tasks,
wherein at least one of the one or more tasks is selected from a library of tasks in which each task has a precondition and a postcondition, and
wherein the desired precondition and postcondition are automatically determined prior to execution.

3. The method of claim 1, wherein the one or more flows, the one or more states, and the one or more rules are coordinated by a controller software module.

4. The method of claim 1,
wherein the first and second business logic are executed by a plurality of parties,
wherein at least one party of the plurality of parties acts as a trusted party for at least one other party in the plurality of parties, and
wherein the trusted party guarantees correctness of a protocol at design time and at run time, maintains records of all interactions, and performs some activities for the at least one other party during the execution of the first and second business logic.

5. The method of claim 1, wherein at least one of the one or more declarative languages is XML.

6. The method of claim 1, wherein at least one of the one or more declarative languages is WSDL.

7. The method of claim 1,
wherein one or more assertions are associated with the first or second process, and
wherein the one or more assertions describe one or more preconditions or one or more postconditions at one or more points in the first or second process.

8. The method of claim 7, wherein the one or more assertions are checked at runtime to ensure that the executing of the first or second business logic is correct.

9. The method of claim 7, wherein the one or more assertions which describe the one or more preconditions are used to check the correctness of the first or second business logic prior to the executing of the first or second business logic.

10. The method of claim 7, wherein the one or more assertions which describe the one or more postconditions are used to check the correctness of the first or second business logic subsequent to the executing of the first or second business logic.

11. The method of claim 1, wherein each of the one or more rules influences the control flow and cause one or more state transitions.

12. The method of claim 1, wherein the first and second business logic is executed via a web-based transport protocol.

13. The method of claim 12, wherein the web-based transport protocol is HTTP.

14. The method of claim 12, wherein the web-based transport protocol is HTTPS.

15. One or more non-transitory computer-readable media having computer-executable instructions stored thereon that, when executed by at least one processor, cause the at least one processor to:
receive first business logic expressed in one or more declarative languages, the first business logic including a first process description, the first process description describing a first process of a business process instance in terms of one or more flows;
receive second business logic expressed in the one or more declarative languages, the second business logic including a second process description, the second process description describing a second process of the business process instance in terms of one or more rules, the second process being different from the first process; and
execute the first business logic and the second business logic,
wherein each of the one or more flows represents a control flow between business functions,
wherein each of the one or more states represents a legal state transition for at least one business entity, and
wherein each of the one or more rules represents a business rule or policy enforced on the at least one business entity in an externalized form.

16. The one or more non-transitory computer-readable media of claim 15,
wherein the first or second process includes one or more tasks,
wherein at least one of the one or more tasks is selected from a library of tasks in which each task has a precondition and a postcondition, and
wherein the desired precondition and postcondition are automatically determined prior to execution.

17. The one or more non-transitory computer-readable media of claim 15, wherein the one or more flows, the one or more states, and the one or more rules are coordinated by a controller software module.

18. The one or more non-transitory computer-readable media of claim 15,
wherein the first and second business logic are executed by a plurality of parties,
wherein at least one party of the plurality of parties acts as a trusted party for at least one other party in the plurality of parties, and
wherein the trusted party guarantees correctness of a protocol at design time and at run time, maintains records of all interactions, and performs some activities for the at least one other party during the execution of the first and second business logic.

19. The one or more non-transitory computer-readable media of claim 15, wherein at least one of the one or more declarative languages is XML.

20. The one or more non-transitory computer-readable media of claim 15, wherein at least one of the one or more declarative languages is WSDL.

21. The one or more non-transitory computer-readable media of claim 15,
wherein one or more assertions are associated with the first or second process, and
wherein the one or more assertions describe one or more preconditions or one or more postconditions at one or more points in the first or second process.

22. The one or more non-transitory computer-readable media of claim 21, wherein the one or more assertions are checked at runtime to ensure that the executing of the first or second business logic is correct.

23. The one or more non-transitory computer-readable media of claim 21, wherein the one or more assertions which describe the one or more preconditions are used to check the correctness of the first or second business logic prior to the executing of the first or second business logic.

24. The one or more non-transitory computer-readable media of claim 21, wherein the one or more assertions which describe the one or more postconditions are used to check the correctness of the first or second business logic subsequent to the executing of the first or second business logic.

25. The one or more non-transitory computer-readable media of claim 15, wherein each of the one or more rules influences the control flow and cause one or more state transitions.

26. The one or more non-transitory computer-readable media of claim 15, wherein the first and second business logic is executed via a web-based transport protocol.

27. The one or more non-transitory computer-readable media of claim 26, wherein the web-based transport protocol is HTTP.

28. The one or more non-transitory computer-readable media of claim 26, wherein the web-based transport protocol is HTTPS.

29. A system, comprising:
- means for receiving first business logic expressed in one or more declarative languages, the first business logic including a first process description, the first process description describing a first process of a business process instance in terms of one or more flows;
- means for receiving second business logic expressed in the one or more declarative languages, the second business logic including a second process description, the second process description describing a second process of the business process instance in terms of one or more rules, the second process being different from the first process; and
- means for executing the first business logic and the second business logic,
- wherein the business process instance is associated with one or more states,
- wherein each of the one or more flows represents a control flow between business functions,
- wherein each of the one or more states represents a legal state transition for at least one business entity, and
- wherein each of the one or more rules represents a business rule or policy enforced on the at least one business entity in an externalized form.

* * * * *